(12) United States Patent  
Shi et al.

(10) Patent No.: US 11,700,518 B2  
(45) Date of Patent: Jul. 11, 2023

(54) METHODS AND SYSTEMS FOR RELAYING FEATURE-DRIVEN COMMUNICATIONS

(71) Applicants: Wuxian Shi, Ottawa (CA); Yiqun Ge, Ottawa (CA); Wen Tong, Ottawa (CA); Qifan Zhang, Kanata (CA)

(72) Inventors: Wuxian Shi, Ottawa (CA); Yiqun Ge, Ottawa (CA); Wen Tong, Ottawa (CA); Qifan Zhang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 380 days.

(21) Appl. No.: 16/884,892

(22) Filed: May 27, 2020

(65) Prior Publication Data

US 2020/0382929 A1 Dec. 3, 2020

Related U.S. Application Data

(60) Provisional application No. 62/855,604, filed on May 31, 2019.

(51) Int. Cl.
*H04W 4/70* (2018.01)
*G06N 3/08* (2023.01)
*G06N 3/045* (2023.01)

(52) U.S. Cl.
CPC .............. *H04W 4/70* (2018.02); *G06N 3/045* (2023.01); *G06N 3/08* (2013.01)

(58) Field of Classification Search
CPC ........ G06N 3/0454; G06N 3/08; G06N 3/084; G06N 3/0445; G06N 3/0481; G06N 3/04; G06N 7/005; G06N 20/00; G06N 3/088; G06N 3/0472; G06N 3/082; G06N 5/046; G06N 3/063; G06N 3/0427; G06N 5/022; G06N 20/20; G06N 3/02; G06N 5/003; G06N 3/0635; G06N 5/04; G06N 20/10; G06N 3/006; G06N 3/049; G06N 3/123; G06N 99/00; G06N 5/025; G06N 5/048
USPC ...................................................... 455/500
See application file for complete search history.

(56) References Cited

U.S. PATENT DOCUMENTS

| 6,226,613 B1* | 5/2001 | Turin ................ G10L 15/142 |
| | | 704/255 |
| 2018/0024968 A1 | 1/2018 | Clinchant et al. |
| 2018/0332301 A1 | 11/2018 | Tian et al. |
| 2022/0005233 A1* | 1/2022 | Kudo .................. G06N 3/08 |
| 2022/0156461 A1* | 5/2022 | Li ....................... G06F 40/58 |
| 2022/0188633 A1* | 6/2022 | Racape ................ G06N 3/08 |

FOREIGN PATENT DOCUMENTS

| CN | 108881196 A | 11/2018 |
| CN | 109389166 A | 2/2019 |
| KR | 20190037025 A | 4/2019 |

* cited by examiner

*Primary Examiner* — Ajibola A Akinyemi

(57) ABSTRACT

Methods and apparatuses for feature-driven communications are described. A set of features describing an observed subject is transmitted by a transmitting electronic device (ED) to a base station (BS). The BS translates the received features to another set of transmission features to be transmitted to a receiving ED. The receiving ED recovers information about the subject from the features received from the BS.

17 Claims, 17 Drawing Sheets

METHODS AND SYSTEMS FOR RELAYING FEATURE-DRIVEN COMMUNICATIONS

CROSS-REFERENCE TO RELATED APPLICATIONS

The present disclosure claims priority from U.S. provisional patent application No. 62/855,604, entitled "METHODS AND SYSTEMS FOR RELAYING FEATURE-DRIVEN COMMUNICATIONS", filed May 31, 2019, the entirety of which is hereby incorporated by reference.

FIELD

The present disclosure relates to feature-driven communications in a network.

BACKGROUND

In a typical modern radio communication system such as wide band code division multiple access (WCDMA), long-term evolution (LTE), 5th Generation (5G), Wi-Fi and so on, a number of electronic devices (EDs) (which may also be referred to as clients, terminals, user equipment (UEs), moving station, etc.) may be connected to or associated with a base station (BS) (which may also be referred to as a base transceiver station (BTS), Node-B, eNodeB, gNB, access point (AP), transmission point (TP), etc.) over-the-air. As the number and density of EDs increase, it becomes challenging to support good quality wireless communications using conventional wireless systems.

Machine-to-machine (M2M) communications may be one type of high density wireless communications. M2M communications is a technology that realizes a network for collecting information from devices (e.g., sensors, smart meters, Internet of Things (IoT) devices, and/or other low-end devices) that are typically massively and densely deployed, and for transmitting information captured by those devices to other applications in the network. M2M networks may be wired or wireless and may have a relatively large geographical distribution (e.g., across a country or across the world). M2M communications typically do not involve direct human intervention for information collection.

Developments for 5G New Radio (NR) system include features to support massive machine type communications (mMTC) that connects large numbers (e.g., millions or billions) of IoT equipment by a wireless system. It is expected in the near future that the amount of M2M communications conducted over-the-air will bypass those of human-related communications.

In some examples, wireless communications may involve a human end user (e.g., a human owner of an ED) receiving information collected by one or more machine sensors. The machine sensors may be densely deployed and may generate a high amount of wireless traffic. The machine sensors may generate more information than the human user actually requires.

Accordingly, it would be desirable to provide a way to improve wireless communications, including communications from one ED to another ED.

SUMMARY

In various examples disclosed herein, methods and apparatuses for feature-driven wireless communications are described. A feature encoder is used to extract a first set of features from raw information at a first ED. A translator in the core network "translates" the first set of features to a second set of features, which a feature decoder at a second ED decodes to recover the information. Feature translation may also be known as mapping, remapping, re-synthesis, aggregation, etc. Accordingly, the translator may also be known by any other equivalent name, such as a feature mapper/re-mapper, feature aggregator, etc. For brevity, this function will be referred to as a translator herein.

Encoder and decoder DNNs are trained using a joint optimization approach, that is able to take into account the physical channel capacity limit. The use of trained encoder and decoder DNNs enable an optimal compression ratio to be used, without required prior knowledge (inherent or structural) about the raw information or the information source. The present disclosure also described example methods which may help to reduce some types of redundancies and alleviate overloaded wireless transmission system.

A set of features describing an observed subject is transmitted by a transmitting electronic device (ED) to another network entity, such as a base station (BS), a base station controller (BSC), a radio network controller (RNC), a component of a core network, or another relaying equipment, among other possibilities. For simplicity, the BS is discussed as the main example; however, it should be understood that feature-based communications need not involve the BS. The BS translates the received features to another set of transmission features to be transmitted to a receiving ED. The receiving ED recovers information about the subject from the features received from the BS.

In some example aspects, the present disclosure describes an apparatus for feature-based communications. The apparatus may be a base station (BS). The apparatus includes: a receiver for receiving, from at least one transmitting electronic device (ED), a set of received features representing a subject, each received feature providing information about a respective probability distribution that each represents one or more aspects of the subject; a translator for translating the set of received features into a set of transmission features representing the subject, each transmission feature providing information about a respective probability distribution that each represents one or more aspects of the subject, at least one probability distribution represented by the set of transmission features being different from the set of received features; and a transmitter for transmitting the set of transmission features to at least one receiving ED.

In any of the examples, the translator may include: a feature decoder configured to recover, from the set of received features, a set of recovered information about the subject from the probability distributions of the received features; and a feature encoder configured to extract one or more transmission features from the set of recovered information and generate the set of transmission features that compresses the recovered information by a compression ratio.

In any of the examples, the feature encoder may implement a probabilistic encoder to provide the compression ratio that satisfies a predetermined physical channel capacity limit for a transmission channel.

In any of the examples, the probabilistic encoder may be implemented using an encoder deep neural network (DNN), and the encoder DNN may be trained to satisfy: a first target of maximizing likelihood between information recovered at a corresponding decoder DNN of the receiving ED and source information at the transmitting ED, and a second target of minimizing an upper boundary of mutual information to be within the predetermined physical channel capacity limit.

In any of the examples, the translator may be implemented using a deep neural network (DNN).

In any of the examples, the apparatus may further include a reducer configured to reduce the set of transmission features to a reduced set of transmission features, and the transmitter may be configured to transmit the reduced set of transmission features.

In any of the examples, the reducer may be configured to reduce the set of transmission features by omitting a feature that is unchanged compared to a previous set of transmission features.

In any of the examples, the reducer may be configured to reduce the set of transmission features in accordance with a requested subset of features from the receiving ED.

In any of the examples, the transmitter may be configured to: assign a sub-channel for transmission of each respective transmission feature, the assigning being based on a relative importance of each transmission feature; and transmit the set of transmission features over the sub-channels.

In any of the examples, each transmission feature may indicate an expectation value of the respective probability distribution and a variance value of the respective probability distribution, and the relative importance of each transmission feature may be determined based on the variance value of each respective feature.

In any of the examples, the transmitter may be further configured to: select a transmission scheme for each assigned sub-channel, the transmission scheme being selected to indicate the variance value of the transmission feature assigned to each respective sub-channel; and transmit the expectation value of each transmission feature over the respective sub-channel in accordance with the respective transmission scheme.

In any of the examples, the transmitter may be further configured to: generate a control message or header indicating the selected transmission scheme and assigned sub-channel for each transmission feature; and transmit the control message or header to the receiving ED.

In some example aspects, the present disclosure describes an apparatus for feature-based communications. The apparatus may be a receiving ED. The apparatus includes: a receiver for receiving over a transmission channel, from a base station (BS), a set of transmitted features representing a subject, each transmitted feature providing information about a respective probability distribution that each represents one or more aspects of the subject; and a feature decoder configured to recover, from the set of transmitted features, a set of recovered information about the subject.

In any of the examples, the feature decoder may implement a probabilistic decoder to recover the set of recovered information from the probability distributions of the transmitted features.

In any of the examples, the apparatus may further include a machine application configured to process the recovered information to make a machine-based decision.

In any of the examples, the machine application may require a subset of the recovered information, and the apparatus may be configured to transmit a control message to the BS to reduce the features in the set of transmitted features.

In any of the examples, the probabilistic decoder may be implemented using a decoder deep neural network (DNN).

In any of the examples, the decoder DNN may be trained to satisfy: a first target of maximizing likelihood between the set of recovered information and source information about the subject, and a second target of minimizing an information bottleneck to be within a predetermined physical channel capacity limit of the transmission channel.

In some example aspects, the present disclosure describes a method for training an encoder and decoder pair for feature-based communications. The method includes: receiving a set of training data samples, the training data samples representing probability distributions representing one or more features of a subject; training a probabilistic feature encoder and probabilistic feature decoder pair together, using joint optimization, the feature encoder and feature decoder pair being trained together to satisfy: a first target of maximizing likelihood between information recovered by the decoder and source information encoded by the encoder, and a second target of minimizing an upper boundary of mutual information to be within a predetermined physical channel capacity limit; and after determining that training has converged to satisfy the first and second targets, storing trained weights for the feature encoder and feature decoder pair.

In some examples, the method may further include: transmitting the trained weights for the feature encoder or the trained weights for the feature decoder to at least one electronic device (ED), to enable the ED to implement the respective feature encoder or feature decoder.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
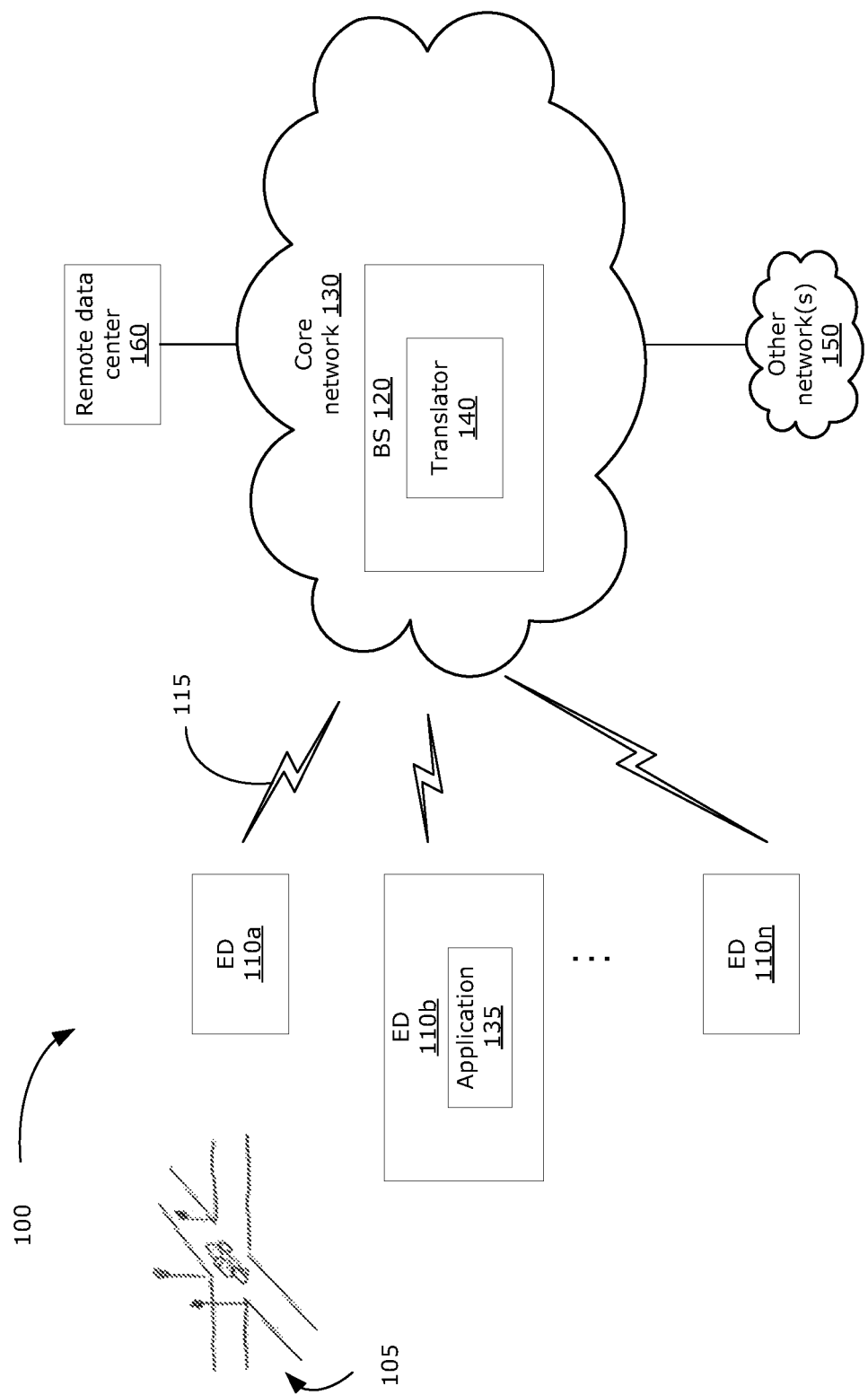
FIG. 1 is a schematic diagram illustrating an example system for feature-driven communications, in which examples described herein may be implemented.

FIG. 1 is a schematic diagram illustrating an example system for feature-driven communications, in which examples described herein may be implemented. The feature-driven communications described herein may be used for machine-to-machine (M2M) communications, machine-to-human communications and/or human-based communications.

In the example shown, the system 100 includes a plurality of electronic devices (EDs) 110a-110n (generically referred to as ED 110). An ED 110 may be a part of, or may itself be, an end user device for wireless operation, for example a user equipment/device (UE), a wireless transmit/receive unit (WTRU), a mobile station, a fixed or mobile subscriber unit, a cellular telephone, a station (STA), a personal digital assistant (PDA), a smartphone, a laptop, a computer, a tablet, or a consumer electronics device, among other possibilities. An ED 110 may be a sensor device, such as an Internet of Things (IoT) device, a smart meter, a wireless sensor, a machine type communication (MTC) device or other such information-gathering device. An ED 110 may implement a machine application, for example, which may be configured to process information (e.g., to make machine-based decisions or interventions). In the example shown, the ED 110b implements a machine application 135. An ED 100 may be used to gather information about a subject 105 of interest. Different EDs 110 may be used to monitor a common subject 105, and to gather information from different perspectives and/or to gather different types of information. For example, one ED may gather visual information from one angle, another ED may gather visual information from another angle, and another ED may gather audio information.

In FIG. 1, each ED 110 is in communication, over a wireless radio channel, with a base station (BS) 120 via a wireless connections 115. For example, the BS 120 may include (or be) one or more of several well-known devices, such as a base transceiver station (BTS), a radio base station, a Node-B (NodeB), an evolved NodeB (eNodeB), a Home eNodeB, a gNodeB (sometimes called a "gigabit" Node B), a transmission point (TP), a transmit and receive point (TRP), a site controller, an access point (AP), or a wireless router, among other possibilities. Although only one BS 120 is shown in FIG. 1, it should be understood that there may be a plurality of BSs 120 in the system 100. A plurality of BSs 120 may be managed by a radio network controller (RNC) or a base station controller (BSC). In examples where an RNC or BSC is present in the system 100, one or more functions described herein as being implemented at the BS 120 may instead by implemented at the RNC or BSC. For simplicity, the present disclosure will discuss implementation at the BS 120 (instead of at the RNC or BSC), however it should be understood that this is not intended to be limiting. Each BS 120 may communicate with and manage a respective plurality of EDs 110. Each ED 110 may communicate with and be managed by a respective one BS 120. In some cases, an ED 110 may communicate with and/or be managed by a plurality of BSs 120. In some examples, different EDs 110 may transmit information to different BSs 120, and may use different channels for the wireless communication 115. For convenience, the BS 120 will be referenced in the singular, however it should be understood that there may be a plurality of BSs 120, and the functions described for a BS 120 may be performed by multiple BSs 120.

The BS 120 may be part of a core network 130. Alternatively, the BS 120 may be outside of the core network 130 (e.g., part of a separate radio access network (RAN)) and may be used to relay information between the EDs 110 and the core network 130. Other network(s) 150 (e.g., the Internet) and/or a remote data center 160 may be connected with the core network 130. The core network 130 may serve as a gateway access from the EDs 110 to the remote data center 160 and/or other network(s) 150.

The BS 120 in this example implements a translator 140 that may be used to facilitate feature-driven communications between two EDs 110, as discussed further below. In the example of FIG. 1, the translator 140 is shown as being part of the BS 120. In other examples, the translator 140 may not be part of the BS 120. For example, the translator 140 may be implemented at another component of the core network 130 outside of the BS 120, may be implemented at the remote data center 160, or in the other network(s) 150, or another relaying equipment (not shown), among other possibilities. In the present disclosure, for convenience, examples are described in which the translator 140 is at the BS 120. However, it should be understood that such examples are not intended to be limiting. In an example where feature-driven communication from a first ED 110a to a second ED 110b is managed by two or more BSs 120 (e.g., the transmitting ED 110a is associated with a first BS 120 and the receiving ED 110b is associated with a second BS 120 (not shown)), the translator 140 of any one BS 120 may be used. Other such variations may be possible.

In the example shown, one or more EDs (e.g., the ED 110a) is a transmitting ED that obtains information about the subject 105, and one or more EDs (e.g., the ED 110b) is a receiving ED that receives information about the monitored subject 105. In the present disclosure, ED 110a may be used to refer to the transmitting ED in general, and multiple transmitting EDs may be indicated with the notation ED 110a-1, ED 110a-2, etc. Similarly, ED 110b may be used to refer to the receiving ED in general, and multiple receiving EDs may be indicated with the notation ED 110b-1, ED 110b-2, etc. It should be understood that, although the present disclosure refers to "transmitting" ED and "receiving" ED, this is only for ease of reference. Each ED 110 may be capable of transmitting and/or receiving at any time. Further, an ED 110 that serves to monitor and transmit information about one subject may (at the same time or at a different time) be a recipient of information about another subject.

The ED 110b implements an application 135 (e.g., a machine application) that may synthesize and process the received information, for example in order to make a decision or intervention based on observations about the subject 105. The application 135 may be implemented at the ED 110b itself (e.g., as shown in FIG. 1), or the ED 110b may forward the information to an external application 135 (e.g., implemented at another physical component, not shown). In the present disclosure, for convenience, examples may be described in which the application 135 is at the ED 110*b*. However, it should be understood that such examples are not intended to be limiting.

Figure 2:
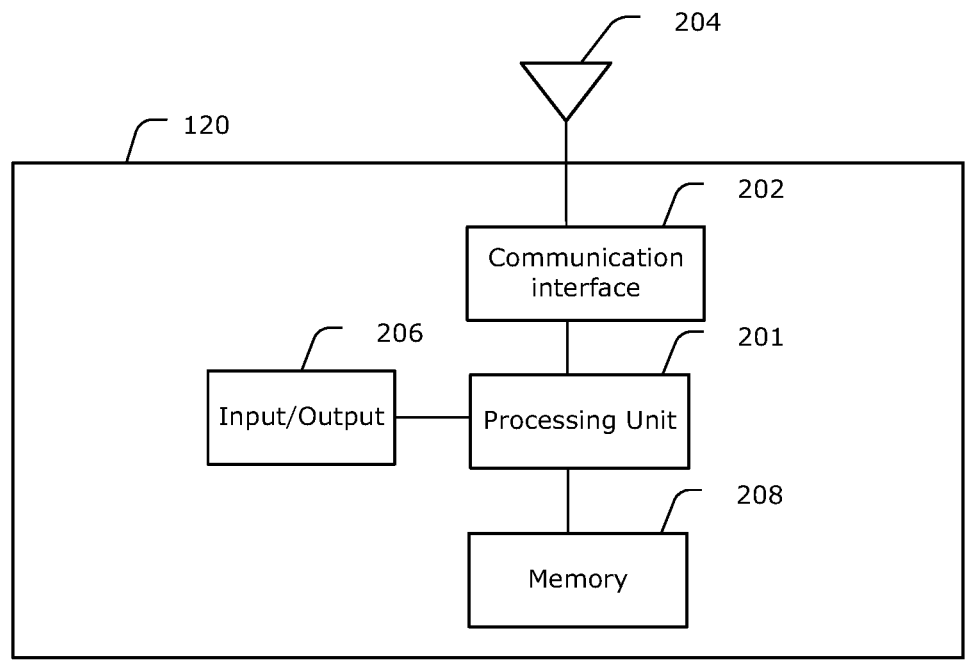
FIG. 2 illustrates an example base station that may be used in the system of FIG. 1.
Figure 3:
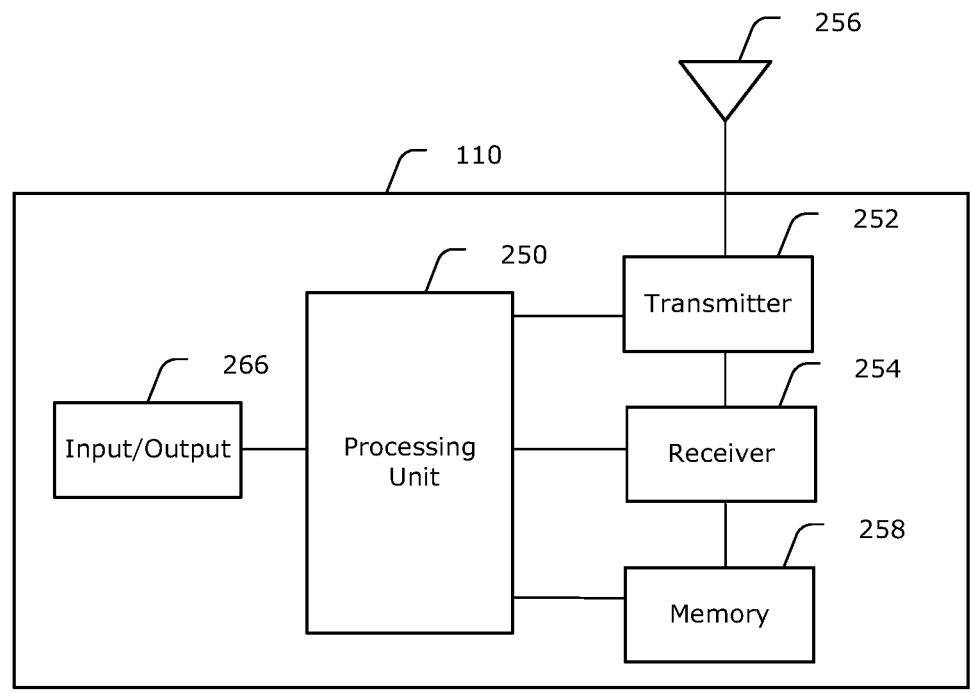
FIG. 3 illustrates an example ED that may be used in the system of FIG. 1.

FIGS. 2 and 3 illustrate example devices that may implement the methods and teachings according to this disclosure. In particular, FIG. 2 illustrates an example BS 120; and FIG. 3 illustrates an example ED 110. These components could be used in the wireless system 100 or in any other suitable system.

As shown in FIG. 2, the BS 120 includes at least one processing unit 201. The processing unit 201 implements various processing operations of the BS 120. For example, the processing unit 201 could perform signal coding, data processing, power control, input/output processing, or any other functionality of the BS 120. The processing unit 201 may also be configured to implement some or all of the functionality and/or embodiments described in more detail herein. Each processing unit 201 includes any suitable processing or computing device configured to perform one or more operations. Each processing unit 201 could, for example, include a microprocessor, microcontroller, digital signal processor, field programmable gate array, or application specific integrated circuit.

The BS 120 also includes at least one communication interface 202 for wired and/or wireless communications. Each communication interface 202 includes any suitable structure for generating signals for wireless or wired transmission and/or processing signals received wirelessly or by wire. The BS 120 in this example includes at least one antenna 204. Each antenna 204 includes any suitable structure for transmitting and/or receiving wireless signals. One or multiple communication interfaces 202 could be used in the BS 120. One or multiple antennas 204 could be used in the BS 120. In some examples, one or more antennas 204 may be an antenna array 204, which may be used to perform beamforming and beam steering operations. Although shown as a single functional unit, a communication interface 202 could also be implemented using at least one transmitter interface and at least one separate receiver interface. A communication interface 202 may be implemented as a transceiver, or may be implemented as a transmitter and a separate receiver.

The BS 120 further includes one or more input/output devices 206 or input/output interfaces (such as a wired interface to the other network(s) 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the BS 120 includes at least one memory 208. The memory 208 stores instructions and data used, generated, or collected by the BS 120. For example, the memory 208 could store software instructions or modules configured to implement some or all of the functionality and/or embodiments described herein and that are executed by the processing unit(s) 201. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the ED 110 includes at least one processing unit 250, at least one transmitter 252, at least one receiver 254, one or more antennas 256, at least one memory 258, and one or more input/output devices or interfaces 266. The processing unit 250 implements various processing operations of the ED 110, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s) such as those described above with respect to FIG. 2. The memory 258 stores instructions and data used, generated, or collected by the ED 110. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications. In some examples, the input/output device/interface 266 may include (or be) a sensing unit that monitors and gathers information about an observed subject. For example, a sensing unit may be a camera, a microphone, an infrared sensing unit, or any other such components.

Referring back to FIG. 1, different transmitting EDs 110*a* may obtain information about different aspects of the subject 105. The information transmitted by each transmitting ED 110*a* may be transmitted using a common information representation scheme or using different schemes. For example, three EDs 110*a* may be used to observe a crossroad as the subject 105. Information from the EDs 110*a* may be used by a transportation service provider application 135, for example. Two EDs 110*a* may be video monitors that capture video information of the subject 105 from different angles, and another ED 110*a* may be an audio monitor that records surrounding audio information. Visual information from different angles and audio information are all examples of different aspects of the subject 105. All three EDs 110*a* may encode and transmit the observed or measured information to the BS 120 via wireless connections 115. The two video EDs 110*a* may be considered the same type of sensor and may use the same information representation scheme and transmission scheme for extracting information from the subject 105 and transmitting information to the BS 120; and the audio ED 110*a* may be considered a different type of sensor and may use a different information representation scheme and transmission scheme, as discussed further below.

In some examples, such transmission of information may take place only when an event of interest occurs (e.g., a car drives by) in the observed subject 105. The BS 120 may receive the information, decode the information, and converge or synthesize the information into a synthesized set of information about the subject 105. The BS 120 may use the translator 140 to translate (or remap) the information to be received by the receiving ED 110b. The information is received by the ED 110b and used as input to the application 135 (which may then make a decision based on the information). In the example where a car is driving by the observed crossroad, if the car is connected to the core network 130 (e.g., as a vehicle-to-everything (V2X) device), the car itself may also provide uplink channel measurement information and may also serve as a type of transmitting ED 110a. In an example scenario, an event of interest in the observed subject 105 may trigger a cascade of actions, such as observation, measurement and reporting by the transmitting EDs 110a, then synthesis and translation at the core network 130, then receiving and decision at the receiving ED 110b.

Generally, the transmission of information (whether from the transmitting ED 110a to the BS 120, or from the BS 120 to the receiving ED 110b) is in accordance with an information representation scheme and a transmission scheme (which may be referred to together as an information representation and transmission scheme, or simply as a scheme). An information representation scheme defines the format (e.g., sampling rates, compression rates, quantization, source encoding) used for the information to be transmitted. A transmission scheme defines the characteristics of the transmission signal (e.g., segmentation, coding length, coding rate, channel coding, modulation, and waveform). Generally, the information representation scheme is implemented by a feature encoder (also referred to as a source encoder), and the transmission scheme is implemented by a channel encoder. There may be multiple schemes available for use by one transmitting ED 110a. For example, multiple schemes may be defined, and may be stored in a local memory (e.g., the memory 258) of the ED 110a. The ED 110a may use one scheme for a particular transmission, and use another scheme for another transmission. Similarly, the BS 120 may have multiple scheme for transmitting to the receiving ED 110b, and may select a scheme to use as appropriate. Some transmitting EDs 110a may have a degree of autonomy. For example, an ED 110a may be capable of adjusting or choosing its own information representation scheme and transmission scheme. Some transmitting EDs 110a may be more passive. For example, an ED 110a may rely on the BS 120 and/or other component of the core network 130 to issue commands or messages via wireless downlink channels to adjust or choose the information representation scheme and transmission scheme.

A conventional approach to designing an information representation scheme for a M2M communication, machine-to-human communication, or human-to-human communication may be based on what has been done for enhanced mobile broadband (eMBB) communications. In the eMBB scenario, the information representation scheme was designed separately from the information transmission scheme, with the aim of satisfying human perception. That is, the goal was to enable an average human to recover as much of the source information as possible. In the eMBB scenario, the information representation scheme was built on the assumption that the transmission scheme would establish a one-to-one solid connection between a device and the core network to ensure the completeness, entirety, and low-latency of a block transmission.

In contrast to the eMBB scenario, it may be expected that at least some of the information transmitted in M2M or machine-to-human communications would be targeted to a machine (e.g., the application 135). Accordingly, the design principles used for developing information representation schemes in eMBB may not be appropriate, especially when the number of transmitting EDs 110a increases. The conventional eMBB approach for designing information representation schemes may not be suitable, for example in part due to expected redundancies discussed below.

One type of redundancy may be referred to as inter-sensor redundancy. Such a redundancy may occur when two or more transmitting EDs 110a observing the same subject 105 capture the same or similar information about the subject 105. It would be redundant for the EDs 110a to each transmit the common information. Furthermore, such redundancy may be found even among different aspects about the same subject 105. For example, audio information (e.g., sound of a car passing through the crossroad) may be correlated with video information (e.g., captured video of the car).

Another type of redundancy may be referred to as time-related redundancy. For example, the information collected, represented, and transmitted by the transmitting ED 110a may contain a portion that varies with time and another portion that is substantially time-invariant. In the present disclosure, time-invariant may refer to information that is substantially unchanged for at least a defined duration of time (e.g., for one hour), or that is very slowly changing such that the information is statistically unchanged for the defined duration of time. In other words, the term time-invariant, as used in the present disclosure, may encompass information that is not strictly time-invariant for all time.

Conventionally, both time-varying and time-invariant information are transmitted equally, because it is typically hard to distinguish between time-varying and time-invariant information in a given transmission, especially when no prior knowledge about statistic and structural properties of the information source is available. Some attempts have been made to reduce time-related redundancy, for example using compressive sensing technology. However, compressive sensing technology is typically reliant on a good understanding of the characteristics of the information source (e.g., size, dimension, statistic property, structural property, worst case, average case and so on), typically requires a large amount of simulations to validate the compression parameters, and typically requires specific constraints on the format of the information source that must be universality adopted. In practical implementation, it is not feasible to customize a set of compressive sensing parameters for every possible information source, particularly in the case where there is limited or no information about the information source. As will be discussed further below, the present disclosure provides an approach to information collection and transmission that enables reduction of time-related redundancy, without requiring detailed knowledge about the information source.

Another type of redundancy may be referred to as perception redundancy. In conventional transmission of information, the human sensory system is the typical point of reference. The human sensory system is generally similar for most humans. For example, light signals outside of the visible spectrum are invisible to the human vision system; and audio signals outside of the human hearing range may not be detectable by the human acoustic system. Conventional information representation schemes have been standardized based on the narrow and well-understood range of the human sensing system. In contrast, a machine may not be limited to the range of the human sensing system. Different machines may have different sensing ranges (e.g., driven by different application purposes), even for observing a common subject. This machine differentiation may make it difficult for any universal standardization.

For example, a first application may process image data to count the number of trucks passing the crossroad, and a second application may process image data to detect identification (e.g., license plate number) of each passing vehicle. The second would require a higher image resolution than the first application. The typical simplest way to design a universal information representation and transmission scheme for transmission of information from the sensors is to adopt the most demanding requirement (e.g., highest image resolution required by the second application) across all sensors. However, the result is that there would be perception redundancy for any application that has a lower requirement (e.g., the second application requires only a lower image resolution). In other words, the information that is transmitted to the second application has more information than required by the second application. The result is that the transmitted information does not make the most efficient use of channel capacity and power resources. However, there are difficulties to establishing an information representation and transmission scheme adapted for each application. These difficulties are similar to those encountered when considering time-related redundancy. For example, there may be little or no knowledge about the characteristics of the source information (i.e., a black-box information source) and there may be endless and unpredictable new updates to the observed subject. Moreover, the amount of perception redundancy may be continuously changing. For example, an application may dynamically and automatically change its information needs. For instance, if vehicular traffic on the crossroad increases, the first application may require an increase in the resolution of the image data.

As well, even for a human user, the human may not be interested in the full range of information all the time. Particularly in the case where information is collected/generated by machine sensors, the information may be overwhelming for human to process in full. Accordingly, there may be perception redundancy when the human recipient needs only a subset of the collected information.

Another type of redundancy may be referred to as importance and quantization redundancy. For example, for a given information source, some observations may be more important or more useful than others. If all observations are treated as equally important, this may result in importance redundancy. Further, the dynamic range of some observations may differ from others. If all observations are compressed or quantized based on the same dynamic range, this may result in quantization redundancy. If there is human involvement, importance and quantization redundancy may be manually tuned (e.g., for image and voice processing, human evaluators may be used to score every optimization in order to arrive at an optimal level of processing). Such manual standardization is very tedious and generally undesirable. Further, this level of standardization likely would not be suitable for communications involving machine sensors, because of the different sensing capabilities of machine sensors and the black-box nature of the information source.

Another challenge is how to take into account the physical channel capacity and condition. In conventional compression methods, channel capacity and condition are estimated in a heuristic way, typically using a number of simulations. For example, a conventional approach may start by assuming infinite channel capacity and zero error transmission, and developing several candidate information representation schemes for one information source, optimized by simulations and human evaluators. The candidate schemes may be classified in terms of compression rates (e.g., the lower the compression rate, the poorer the perceived quality by a human), and the minimum channel capacity required for each scheme is determined and specified in a specification. On implementation, either an encoder chooses an information representation scheme (e.g., defining compression, quantization, and source encoding schemes) and then selects the correspondent channel capacity from which a transmission scheme (e.g., defining channel code, modulation, and waveform) is determined; or given an available channel capacity, the encoder chooses a corresponding information representation scheme. This conventional approach aims to satisfy human perception and also efficiently use the granted physical channel capacity. Such an approach may not be suitable for 5G NR and future generation communications, at least because it would be difficult to account for the different characteristics of machine applications and black-box, unpredicted information sources.

In particular, a given information representation scheme is relevant to its transmission scheme, for a given information source and an available channel capacity. The present disclosure describes, in some examples, an autonomous (e.g., machine-learning based) approach to find a suitable information representation scheme (e.g., including compression), for a given black-box information source. The disclosed approach takes into account the channel condition, and is able to adapt to changing channel conditions. The disclosed approach may help to address the above-discussed redundancies, and may help reduce traffic over wireless connections.

Examples described herein provide an encoding method (defined by the information representation scheme) to extract the features of interest from the information collected by the transmitting EDs. As will be discussed further below, the extracted features may include information about likelihood distributions, and possibly information about some inherent and latent structure, of the raw information. The features may be extracted from a plurality of raw information sets collected from a plurality of sensors observing a common subject. Coordination among the sensors may be managed at a higher network level (e.g., in the core network). The encoding method is invertible to a corresponding decoding method that recovers the information (e.g., from a number of likelihood distributions). It should be understood that the term "features" in the present disclosure may also encompass "textures". Texture may refer to the arrangement of color and/or intensities (e.g., in grayscale images) in an image.

Examples described herein also may enable determination of a suitable compression ratio and configuration of sub-channels. For example, for a given physical channel capacity, the optimal information representation scheme (which defines the optimal compression ratio and partition of the features) can be found that reaches the maximum likelihood criteria but with the lowest aggregated physical channel capacity requirements. The amount of features extracted from the raw information may be smaller than the amount of the raw information (i.e., a dimensional reduction). The features may be transmitted over a transmission scheme that defines sub-channels whose configurations are a function of the features. Sub-channelization may be facilitated by the use of features as the basis for transmission (rather than raw information). As will be discussed below, raw information may be encoded as features, which may in turn be divided into different sub-channels for transmission. This approach may help to increase parallelism and may help to reduce latency.

Examples described herein facilitate design of transceivers based on the features transmitted, rather than based on the raw information. For example, transceivers may be designed to identify redundancies (e.g., as discussed above) and account for such redundancies. In some examples, redundancies may be predicted or inferred (e.g., using machine learning).

Examples described herein provide a translator, implemented in the BS (or elsewhere in the core network) to facilitate communication of information from one or more transmitting EDs to one or more receiving EDs. In particular, the transmitting ED(s) may not require information about the specific features of interest and/or the machine application at the receiving ED(s). Similarly, the receiving ED(s) may not require information about the information source. In some implementations, the BS may not require any access to the information being relayed to the receiving ED(s), and may not require any knowledge about the source information or its inherent structure.

Figure 4:
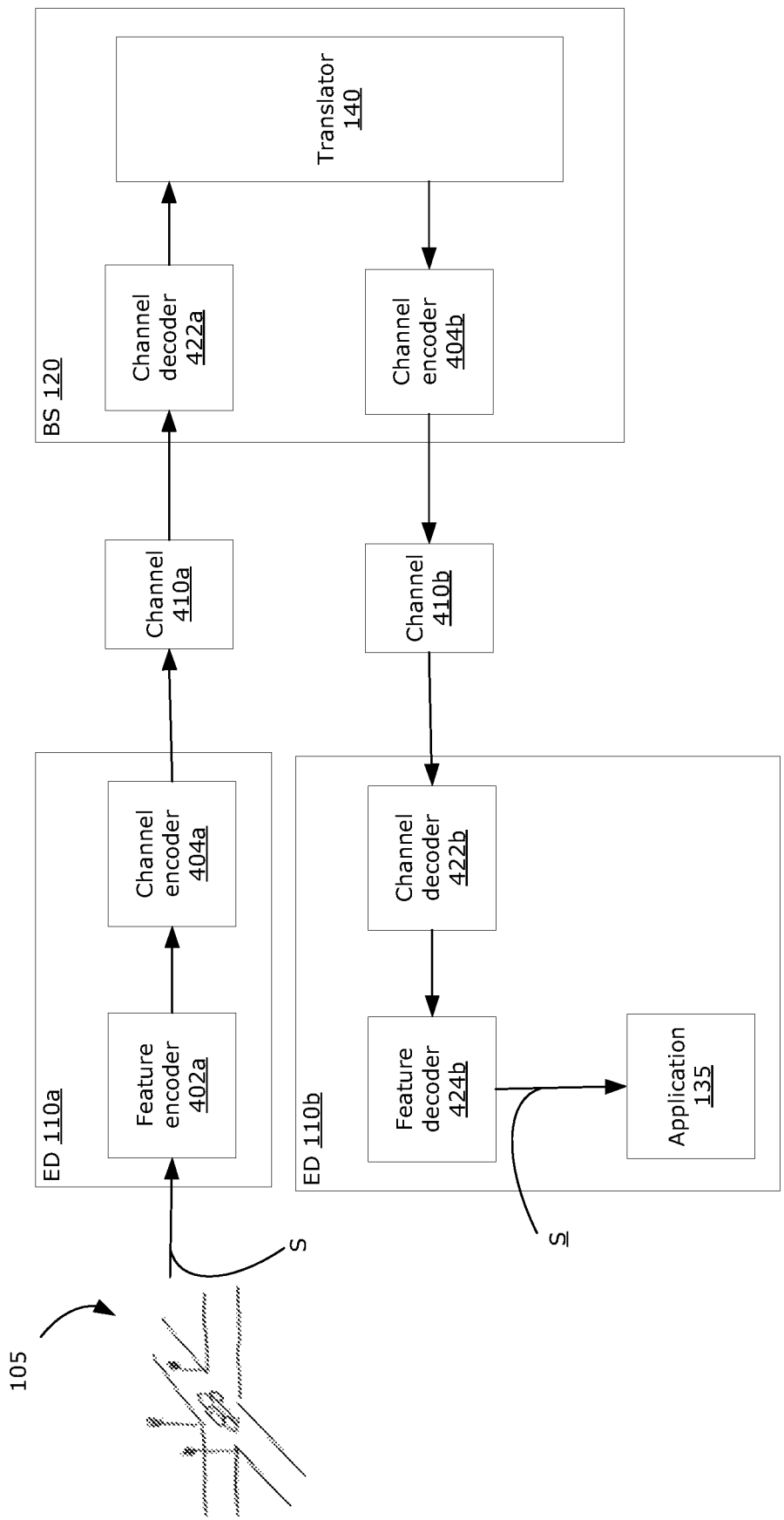
FIG. 4 is a simplified block diagram illustrating an example transceiver chain for feature-driven communications from one ED to another ED.

Reference is now made to FIG. 4, which is a simplified block diagram illustrating an example transceiver chain for feature-driven communications from the transmitting ED 110a to the receiving ED 110b. It should be understood that the roles of transmitting and receiving may be reversed. FIG. 4 shows a single transmitting ED 110a and a single receiving ED 110b for simplicity only; in other examples there may be more than one transmitting ED 110a observing the same subject 105 and/or there may be more than one receiving ED 110b requesting information about the subject 105. The uplink (UL) transmission from the transmitting ED 110a to the BS 120 is transmitted over an UL channel 410a, and downlink (DL) transmission from the BS 120 to the receiving ED 110b is transmitted over a DL channel 410b. Any nodes that may be traversed by the UL or DL transmission may be modeled as part of the respective UL or DL channel 410a, 410b.

The receiving ED 110b may implement the machine application 135 for processing the information (or may forward the information to another entity for further processing). In this example, feature-driven transmission from the transmitting ED 110a to the receiving ED 110b is facilitated by the BS 120, which implements the translator 140.

In FIG. 4, the transmitting ED 110a obtains a set of collected information S about the observed subject 105. The transmitting ED 110a uses a feature encoder 402a to extract features from the raw information in accordance with an information representation scheme, forming set of features. The information representation scheme (which may be defined using a machine-learning approach, as discussed further below) defines parameters such as sampling rate, compression ratio, quantization, and feature extraction, among others. The set of features is provided to an UL channel encoder 404a. The UL channel encoder 404a may be part of or referred to as a transmitter of the transmitting ED 110a. The UL channel encoder 404a encodes the set of features for UL transmission in accordance with an UL transmission scheme. The UL transmission scheme (which may be defined using a machine-learning approach, as discussed further below) defines parameters such as segmentation, coding length, coding rate, sub-channelization, the modulation and coding scheme (MCS) and signal waveform, among others. The transmission passes through the UL channel 410a, which represents all components between the UL channel encoder 404a of the transmitting ED 110a and an UL channel decoder 422a of the BS 120. The UL channel decoder 422a may be part of or referred to as a receiver of the BS 120. The UL channel 410a may represent, for example, any intervening nodes, relays, over-the-air channel and environmental factors that may affect the transmission. The UL channel 410a may be considered to be hostile to the transmission in that the UL channel 410a is expected to introduce noise to the transmission and also limits the transmission according to the channel capacity limit.

The transmission is received and outputted by the UL channel decoder 422a of the BS 120 as a set of received features. The set of received features may be noisy, due to the effects of the UL channel 410a. It should be noted that the UL channel decoder 422a and the UL channel encoder 404a are aligned using the same transmission scheme, such that the UL channel decoder 422a knows the sub-channelization, the MCS and waveform, etc. used by the UL channel encoder 404a for example. The translator 140 converts the set of received features to a second set of features for DL transmission. It should be noted that the translator 140 may change the dimensionality of the features. For example, there may be 20 features inputted into the translator 140 and 10 features outputted from the translator 140. It should be noted that the conversion of features performed by the translator 140 may be simple (e.g., 1-to-1 or 2-to-1 mapping) and linear or may be complex and non-linear (e.g., implemented using a trained neural network), as discussed further below.

The converted features are inputted to a DL channel encoder 404b that encodes the set of features for DL transmission in accordance with a DL transmission scheme. The DL channel encoder 404b may be part of or referred to as a transmitter of the BS 120. The DL transmission scheme, similarly to the UL transmission scheme, may be defined using a machine-learning approach, and defines parameters such as segmentation, coding length, coding rate, sub-channelization, the MCS and signal waveform, among others. The transmission passes through the DL channel 410b, which represents all components between the DL channel encoder 404b and a DL channel decoder 422b at the receiving ED 110b. The DL channel decoder 422b may be part of or referred to as the receiver of the receiving ED 110b. The DL channel 410b may represent, for example, any intervening nodes, relays, over-the-air channel and environmental factors that may affect the transmission. Similarly to the UL channel 410a, the DL channel 410b may be considered to be hostile to the transmission.

The DL transmission is outputted by the DL channel decoder 422b as another set of received features. It should be noted that the DL channel decoder 422b and the DL channel encoder 404b are aligned using the same transmission scheme. The set of received features is decoded by a feature decoder 424b of at the receiving ED 110b to recover a set of recovered information $\underline{S}$. This recovered information $\underline{S}$ may be further processed by a machine application 135, for example.

Although FIG. 4 shows the channel decoder 422a, channel encoder 404b, and translator 140 as being implemented in the BS 120, in other examples one or more of these may be implemented in another component of the core network 130. In other examples, the channel decoder 422a and channel encoder 404b may be implemented in the BS 120, but the translator 140 may be implemented in another component of the core network 130, in which case the BS 120 may communicate with the core network 130 for the translator function. For simplicity, examples will be described in which the channel decoder 422a, channel encoder 404b and translator 140 are implemented in the BS 120, and the BS 120 is part of the core network 130, but it should be understood that this is not intended to be limiting.

It should be noted that the raw information source is a black box, meaning that neither the EDs 110a, 110b nor the BS 120 has any information about the subject 105 or how the raw information is collected by the (e.g., little or no information about organization, format, inherent structures, or sampling noise of the information source).

A machine-learning based approach for designing an information representation scheme and transmission is now described, in the context of the UL transmission (i.e., from the transmitting ED 110a to the BS 120). It should be understood that a similar machine-learning based design approach may be used for the DL transmission (i.e., from the BS 120 to the receiving ED 110b).

Figure 5A:
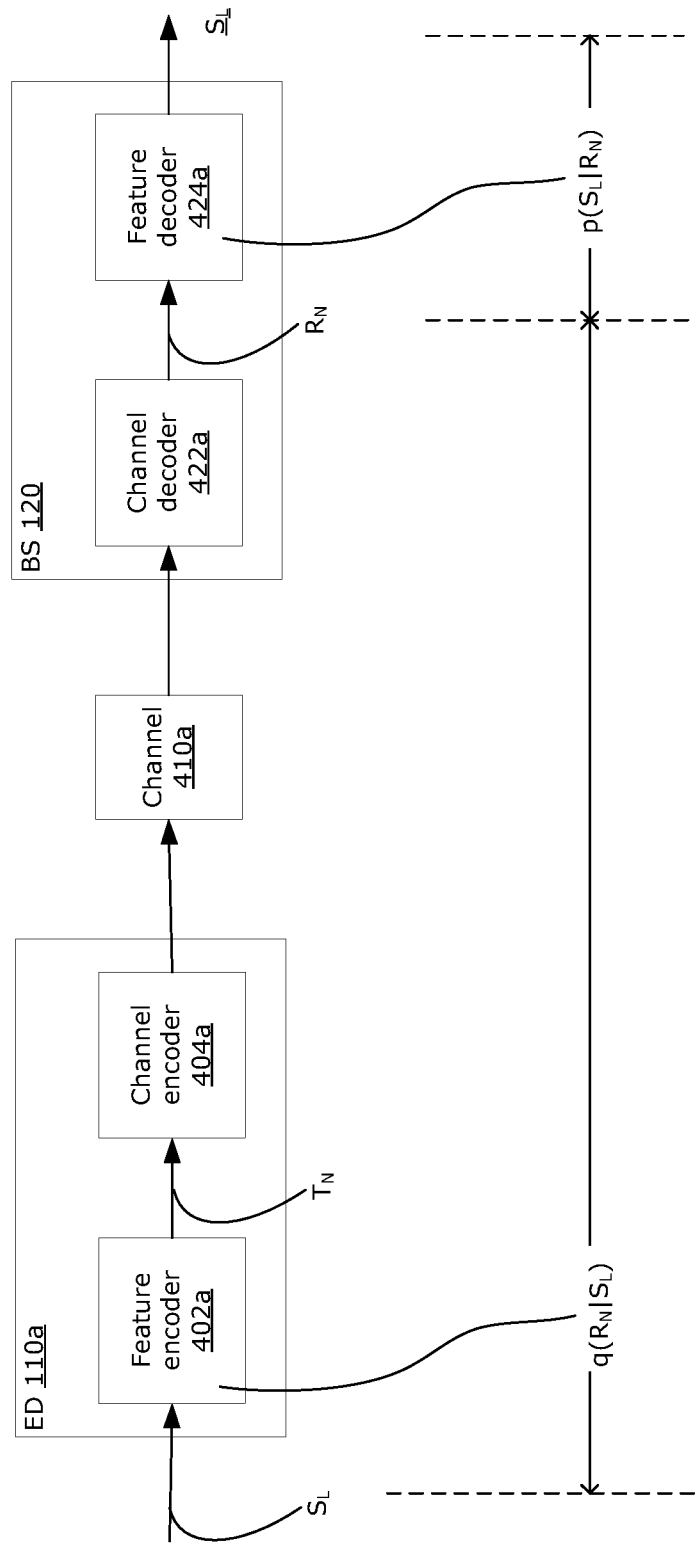
FIG. 5A illustrates an example model for training encoder and decoder DNNs for the transceiver chain from a transmitting ED to the BS.

FIG. 5A illustrates a model that may be used for training a machine-learning based implementation of the UL transceiver chain. For the purpose of training, a feature decoder 424a is modeled in the BS 120. The feature decoder 424a may be included in actual implementation in the BS 120 (e.g., as part of the translator 140) or may not be used in actual implementation. The present disclosure describes a machine-learning based approach to design the information representation scheme to reduce (or compress) the amount of information that needs to be wirelessly transmitted. The information representation scheme may help to reduce or avoid at least some of the redundancies discussed previously. The information representation scheme may be thought of as a dimension reduction algorithm at the feature encoder 402a, and may include parameters that define sampling, compressing, quantization, feature-extracting (or texture extracting), and/or source encoding. The information representation scheme may be invertible to enable recovering of information at the feature decoder 424a.

One approach for designing the feature encoder 402a and feature decoder 424a to be invertible to each other is to consider an approach similar to training of an autoencoder, in which the encoder and decoder are jointly optimized. However, as will be discussed below, the neural networks for implementing the feature encoder 402a and feature decoder 424a cannot be trained exactly like an autoencoder. The reasons for this include the channel which adds noise to the signal, thus making the equation not differentiable and back propagation not possible. Another reason is that the characteristics of the channel and/or the observed subject itself can be always changing, meaning that the conditions are not stable enough.

The feature decoder 424 in the example of FIG. 5A is a probabilistic decoder that aims to recover the L-dimensional set of raw information $S_L$, given the N-dimensional set of received features $R_N$. Mathematically, the feature decoder 424a outputs the L-dimensional set of recovered information $\underline{S}_L$ given an N-dimensional set of received features $R_N$, based on the likelihood probability $p(S_L|R_N)$, and the received features $R_N$ may be treated as the latent layer. Correspondingly, the feature encoder 402a may implement a probabilistic encoder that encodes the set pf raw information $S_L$ into the set of received features $R_N$. Mathematically, the feature encoder 402a outputs the set of received features $R_N$ based on the likelihood probability $q(R_N|S_L)$. Notably, as indicated in FIG. 5A, the likelihood probability $q( )$ represents the likelihood of the received features $R_N$ at the output of the channel decoder 422a, given the raw information $S_L$ at the input of the feature encoder 402a. Thus, the likelihood probability $q( )$ encompasses the effects of the channel encoder 404a and channel decoder 422a on the transmission (which can be characterized and known) and also the effects of the channel 410a on the transmission (which may be unknown). Therefore, optimization of the probability encoder for the feature encoder 402a necessarily takes into account the physical channel 410a, in particular the Shannon limit of the channel 410a. This approach links design of the compression scheme with consideration of the physical channel 410a.

Both the probabilistic feature encoder and the probabilistic feature decoder should be jointly optimized to maximize the likelihood between $S_L$ and $\underline{S}_L$ and to minimize the mutual information between $S_L$ and $R_N$ for a given subject and channel capacity limit. Optimization may be performed using a machine-learning based approach, with the aim of transmitting as much essential information about the subject as possible and consuming as little physical radio resource as possible.

First, consider the feature decoder 424a that receives an N-dimensional vector $\vec{R}_N$ of soft-values from the channel decoder 422a. It should be noted that, in some of the following mathematical discussions, $R_N$, $S_L$, and $\underline{S}_L$ are denoted as vectors. The mathematical equations may operate on vectors. However, it should be understood that, in general, $R_N$, $S_L$, and $\underline{S}_L$ may be "sets" of information or any other information structure. The channel decoder 422a may assume the received signals are independent and identically distributed (iid) such that the output $\vec{R}_N$ contains N independent Gaussian distributions. The feature decoder 424a uses the likelihood probability $p( )$ to decode (or decompress) $\vec{R}_N$ into a vector $\underline{\vec{s}}_L$. $\underline{\vec{s}}_L$ is an L-dimensional signal, each dimension independently following a Gaussian or Bernoulli distribution. It should be noted that L≠N, and typically L>N. Mathematically, this can be represented as:

$$\vec{R}_N = \begin{pmatrix} R_0 \\ \ldots \\ R_{N-1} \end{pmatrix}; p(\vec{R}_N) \sim N(\vec{\mu}_R, \Sigma_R)$$

$$\vec{S}_L = \begin{pmatrix} S_0 \\ \ldots \\ S_{L-1} \end{pmatrix}; p(\vec{S}_L) \sim N(\vec{\mu}_S, \Sigma_S)$$

where $N( )$ is a Gaussian distribution, $\vec{\mu}_R$ is a vector of the expectation value (or mean) of each received feature Gaussian distribution, $\vec{\mu}_R$ is a vector of the expectation value (or mean) of each recovered information Gaussian distribution, and $\Sigma$ is a covariance matrix.

Figure 5B:
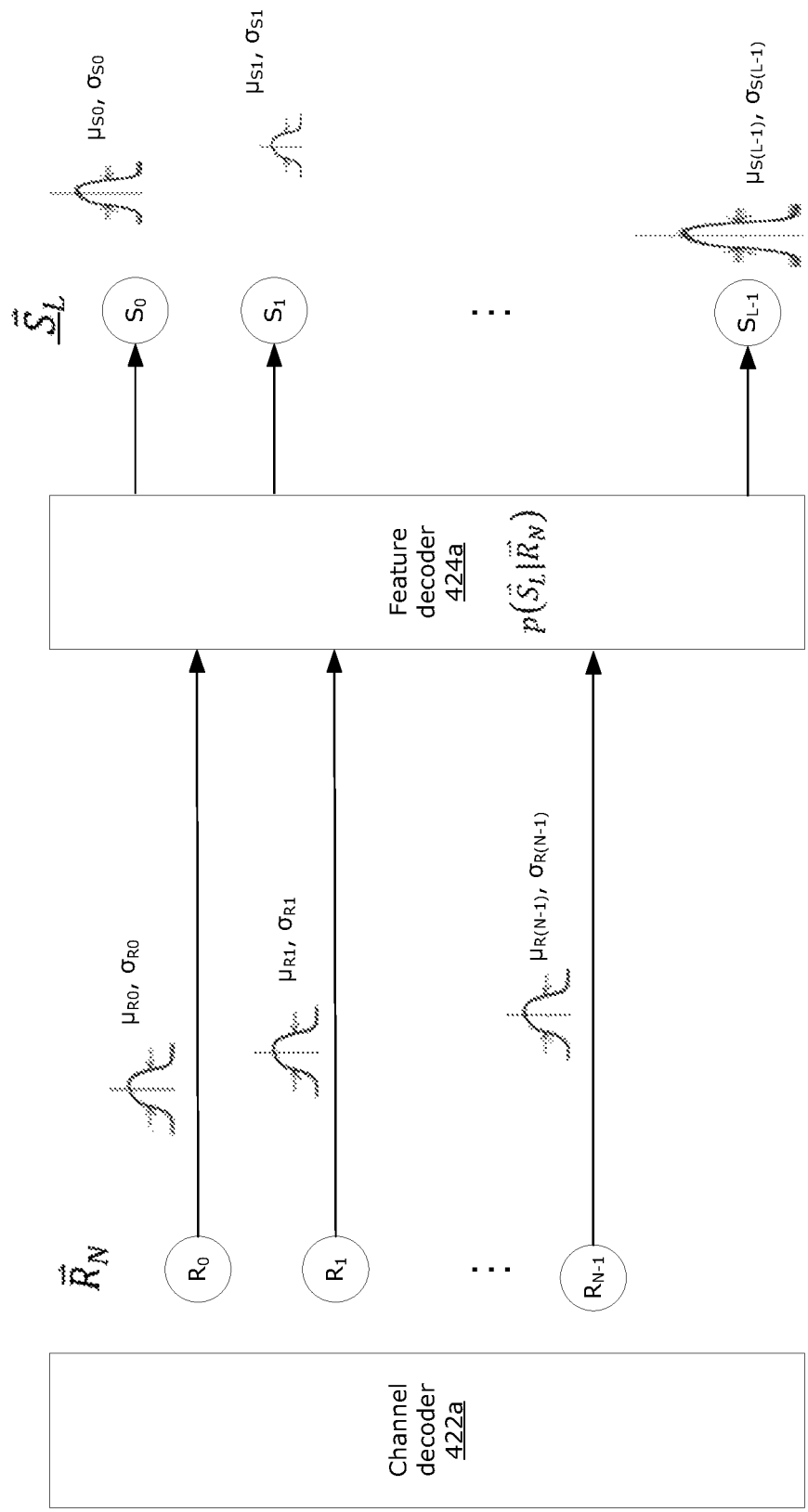
FIG. 5B is a schematic diagram that provides a simplified illustration of a probabilistic decoder.

FIG. 5B is a schematic diagram that provides a simplified illustration of the probabilistic feature decoder 424a. In this example, we assume that $\vec{s}_L$ also has a Gaussian distribution; however, in other examples $\vec{s}_L$ may have, for example, a Bernoulli distribution. As shown, the channel decoder 422a, having received a transmission via a wireless channel, converts (based a transmission scheme) the received signal into a set of N received features $\vec{R}_N$. Each of the features $R_0$ to $R_{N-1}$ describes a respective probability distribution in terms of expectation value and variance. These values are inputted to the feature decoder 424a, which converts $\vec{R}_N$ into a set of L recovered information $\vec{s}_L$. Because in this example $\vec{s}_L$ is assumed to be Gaussian distributed, each of the recovered information $S_0$ to $S_{L-1}$ describes a respective recovered probability distribution in terms of expectation value and variance. It should be noted that L>N, and the probability distributions recovered in $\vec{s}_L$ may be different from the probability distributions of the received features $\vec{R}_N$.

For a given $\vec{R}_N$, the probabilistic feature decoder outputs $\vec{s}_L$ using $p(\vec{s}_L | \vec{R}_N)$. Mathematically, it is hard to exhaustively find $p(\vec{s}_L | \vec{R}_N)$ in a high dimensional signal space. In examples described herein, a deep neural network (DNN) $p_\phi(\vec{s}_L | \vec{R}_N)$ is used to approximate the true $p(\vec{s}_L | \vec{R}_N)$, where $\phi$ is the set of the neuron weights and thresholds. The architecture of the DNN $p_\phi$ (such as number of layers, connection among the neurons, and threshold functions on each neuron and so on) may be varied for individual implementation. For example, a CNN (convolutional-NN), RNN (recurrent-NN), and/or GNN (Graph-NN) may be used to describe the architecture of the DNN $p_\phi$. A loss/reward function can be designed based on maximum log likelihood, with the input samples $\vec{R}_N$ and output samples $\vec{s}_L$ as follows:

$$\phi^* = \underset{\phi}{\mathrm{argmax}}\left\{E_{\vec{R}_N \sim p(\vec{R}_N), \vec{s}_L \sim p(\vec{s}_L)}\left[\ln\left(p_\phi(\vec{S}_L | \vec{R}_N)\right)\right]\right\}$$

In theory, the DNN training can be done using stochastic gradient descent (SGD) backward propagation. If $p(\vec{s}_L)$ is a Bernoulli distribution, the maximum-log-likelihood becomes a cross-entropy measurement. If $p(\vec{s}_L)$ is a Guassian distribution, the maximum-log-likelihood becomes a mean square error (MSE) minimization.

However, in practice, this approach is not feasible. $\vec{R}_N$ includes the effect of added noise on $\vec{s}_{LL}$. How much noise is added affects the statistics of $\vec{R}_N$ and the noise is unknown to the DNN $p_\phi(\vec{s}_{LL} | \vec{R}_N)$. Mathematically, the DNN is required to search for a maximum likelihood (ML) optimal solution. It may not be possible for the DNN to fully explore the entire high dimensional space occupied by $\vec{R}_N$.

Similarly, the feature encoder 402a may be implemented using another DNN $q_\theta(\vec{R}_N | \vec{s}_{LL})$ where $\theta$ is the set of the neuron weights and thresholds for a probabilistic encoder. Similarly, to the DNN $p_\phi$ described above, the architecture of the DNN $q_\theta$ (such as number of layers, connection among the neurons, and threshold functions on each neuron and so on) may be varied for individual implementation. For example, CNN, RNN, and/or GNN may be used to describe the architecture of the DNN $q_\theta$. $q_\theta(\vec{s}_{LL}, \vec{R}_N)$ should meet the requirement that the information bottleneck is within the Shannon capacity of the channel. That is, $q_\theta(\vec{s}_{LL}, \vec{R}_N)$ must compress $\vec{s}_{LL}$ into an $\vec{R}_N$ that fits within the channel capacity $C_{limit}$. The information bottleneck may be conceptually thought of as the upper boundary of the mutual information between $\vec{s}_{LL}$ and $\vec{R}_N$. Mathematically, this may be represented as:

$$I(\vec{S}_{LL}, \vec{R}_N) \geq C_{limit}$$

where I( ) is mutual information, and where $C_{limit}$ can be calculated using the Shannon-Hartley theorem as follows:

$$C_{limit} = W \ln\left(1 + \frac{S}{N}\right)$$

where W represents the occupied bandwidth, S represents the signal power, and N represents the channel noise power. The ratio S/N may also be referred to as the signal-to-noise ratio (SNR).

The goal of the training is to make the joint probability $p_\phi(\vec{s}_{LL}, \vec{R}_N)$ and the joint probability $q_\theta(\vec{s}_{LL}, \vec{R}_N)$ as similar to each as possible. The similarity between two probabilities can be indicated by their Kullback-Leibler (KL) divergence as follows:

$$KL\big(q_\theta(\vec{S}_L, \vec{R}_N) \big| p_\phi(\vec{S}_L, \vec{R}_N)\big) = \int\int q_\theta(\vec{S}_L, \vec{R}_N) \cdot \ln\left(\frac{q_\theta(\vec{S}_L, \vec{R}_N)}{p_\phi(\vec{S}_L, \vec{R}_N)}\right) \cdot d\vec{S}_L \cdot d\vec{R}_N$$

The aim of training the DNN is to find $\langle \theta^*, \phi^* \rangle$ that minimizes this KL divergence, where the notation * indicates the weights $\langle \theta^*, \phi^* \rangle$ have been found by this optimization. In particular, the ideal case is KL=0, $q_\theta(\vec{s}_{LL}, \vec{R}_N) = p_\phi(\vec{s}_{LL}, \vec{R}_N)$. The minimization function may be represented as:

$$\langle \theta^*, \phi^* \rangle = \underset{\langle \theta, \phi \rangle}{\mathrm{argmin}}\big\{KL\big(q_\theta(\vec{S}_L, \vec{R}_N) \big| p_\phi(\vec{S}_L, \vec{R}_N)\big)\big\}$$

Returning to the previous equation, because:

$q_\theta(\vec{s}_{LL}, \vec{R}_N) = q_\theta(\vec{R}_N | \vec{s}_{LL}) \cdot p(\vec{s}_{LL})$ therefore a substitution may be made as follows:

$$KL\big(q_\theta(\vec{S}_L, \vec{R}_N) \big| p_\phi(\vec{S}_L, \vec{R}_N)\big) =$$

$$\int\int q_\theta(\vec{S}_L, \vec{R}_N) \cdot \ln\left(\frac{q_\theta(\vec{S}_L, \vec{R}_N)}{p_\phi(\vec{S}_L, \vec{R}_N)}\right) \cdot d\vec{S}_L \cdot d\vec{R}_N =$$

$$\int_{\vec{S}_L} p(\vec{S}_L) \cdot \left(\int_{\vec{R}_N} q_\theta(\vec{R}_N | \vec{S}_L) \cdot \ln\left(\frac{q_\theta(\vec{R}_N | \vec{S}_L)}{p_\phi(\vec{S}_L, \vec{R}_N)}\right) \cdot d\vec{R}_N + \int_{\vec{R}_N} q_\theta(\vec{R}_N | \vec{S}_L) \cdot \ln(p(\vec{S}_L)) \cdot d\vec{R}_N\right) \cdot d\vec{S}_L$$

If a Monte-Carlo method is used on the $\vec{s}_{LL}$ sampling set, this equation becomes:

$$= E_{\vec{S}_L \sim p(\vec{S}_L)}\left[\int_{\vec{R}_N} q_\theta(\vec{R}_N | \vec{S}_L) \cdot \ln\left(\frac{q_\theta(\vec{R}_N | \vec{S}_L)}{p_\phi(\vec{S}_L, \vec{R}_N)}\right) \cdot d\vec{R}_N + \int_{\vec{R}_N} q_\theta(\vec{R}_N | \vec{S}_L) \cdot \ln(p(\vec{S}_L)) \cdot d\vec{R}_N\right]$$

Substituting:

$$\int \vec{R}_N q_\theta(\vec{R}_N | \vec{S}_L) \cdot \ln(p(\vec{S}_L)) \cdot d\vec{R}_N = \ln(p(\vec{S}_L)) \cdot \int \vec{R}_N q_\theta(\vec{R}_N | \vec{S}_L) \cdot d\vec{R}_N = \ln(p(\vec{S}_L)),$$

the equation becomes:

$$= E_{\vec{S}_L \sim p(\vec{S}_L)} \left[ \int_{\vec{R}_N} q_\theta(\vec{R}_N | \vec{S}_L) \cdot \ln\left(\frac{q_\theta(\vec{R}_N | \vec{S}_L)}{p_\phi(\vec{S}_L, \vec{R}_N)}\right) \cdot d\vec{R}_N + \ln(p(\vec{S}_L)) \right] =$$

$$E_{\vec{S}_L \sim p(\vec{S}_L)} \left[ \int_{\vec{R}_N} q_\theta(\vec{R}_N | \vec{S}_L) \cdot \ln\left(\frac{q_\theta(\vec{R}_N | \vec{S}_L)}{p_\phi(\vec{S}_L | \vec{R}_N) \cdot p(\vec{R}_N)}\right) \cdot d\vec{R}_N + \ln(p(\vec{S}_L)) \right] =$$

$$E_{\vec{S}_L \sim p(\vec{S}_L)} \left[ \int_{\vec{R}_N} q_\theta(\vec{R}_N | \vec{S}_L) \cdot \ln\left(\frac{q_\theta(\vec{R}_N | \vec{S}_L)}{p(\vec{R}_N)}\right) \cdot d\vec{R}_N - \int_{\vec{R}_N} q_\theta(\vec{R}_N | \vec{S}_L) \cdot \ln(p_\phi(\vec{S}_L | \vec{R}_N)) \cdot d\vec{R}_N + \ln(p(\vec{S}_L)) \right]$$

If the Monte-Carlo method is applied on the $\vec{R}_N$ sampling set given a $\vec{S}_L$, the equation becomes:

$$= E_{\vec{S}_L \sim p(\vec{S}_L)} [KL(q_\theta(\vec{R}_N | \vec{S}_L) | p(\vec{R}_N)) - E_{\vec{R}_N \sim q_\theta(\vec{R}_N | \vec{S}_L)}[\ln(p_\phi(\vec{S}_L | \vec{R}_N))] + \ln(p(\vec{S}_L))]$$

Because $p(\vec{S}_L)$ is an inherent statistic of the raw source information $\vec{S}_L$, this cannot be changed. Thus, the aim of minimizing $KL(q_\theta(\vec{S}_L, \vec{R}_N) | p(\vec{S}_L, \vec{R}_N))$ becomes minimizing:

$$E_{\vec{S}_L \sim p(\vec{S}_L)} [KL(q_\theta(\vec{R}_N | \vec{S}_L) | p(\vec{R}_N))] - E_{\vec{S}_L \sim p(\vec{S}_L), \vec{R}_N \sim q_\theta(\vec{R}_N | \vec{S}_L)} [\ln(p_\phi(\vec{S}_L | \vec{R}_N))]$$

At the end, the joint goal of connecting two DNNs $q_\theta(\vec{R}_N | \vec{S}_L)$ and $p_\phi(\vec{S}_L | \vec{R}_N)$ may be expressed as:

$$\langle \theta^*, \phi^* \rangle = \underset{\langle \theta \rangle}{\mathrm{argmin}} \left\{ E_{\vec{S}_L \sim p(\vec{S}_L)} \left[ KL(q_\theta(\vec{R}_N | \vec{S}_L) | p(\vec{R}_N)) \right] - E_{\vec{S}_L \sim p(\vec{S}_L), \vec{R}_N \sim q_\theta(\vec{R}_N | \vec{S}_L)} \left[ \ln(p_\phi(\vec{S}_L | \vec{R}_N)) \right] \right\}$$

Which may be further written as:

$$\langle \theta^*, \phi^* \rangle = \underset{\langle \theta, \phi \rangle}{\mathrm{argmin}} \left\{ E_{\vec{S}_L \sim p(\vec{S}_L)} \left[ KL(q_\theta(\vec{R}_N | \vec{S}_L) | p(\vec{R}_N)) \right] \right\} + \underset{\langle \phi \rangle}{\mathrm{argmin}} \left\{ E_{\vec{S}_L \sim p(\vec{S}_L), \vec{R}_N \sim q_\theta(\vec{R}_N | \vec{S}_L)} \left[ \ln(p_\phi(\vec{S}_L | \vec{R}_N)) \right] \right\}$$

The second portion of this equation, $$\underset{\langle \phi \rangle}{\mathrm{argmin}} \left\{ E_{\vec{S}_L \sim p(\vec{S}_L), \vec{R}_N \sim q_\theta(\vec{R}_N | \vec{S}_L)} \left[ \ln(p_\phi(\vec{S}_L | \vec{R}_N)) \right] \right\}$$

may be interpreted as a first rule that aims to jointly optimize both the encoder $q_\theta(\vec{R}_N | \vec{S}_L)$ and the feature decoder $p_\phi(\vec{S}_L | \vec{R}_N)$ to achieve the output $\hat{S}_L$ that is as similar as possible to the original $\vec{S}_L$. This may be referred to as the maximum likelihood target. The first portion of the equation, $$\underset{\langle \theta \rangle}{\mathrm{argmin}} \left\{ E_{\vec{S}_L \sim p(\vec{S}_L)} \left[ KL(q_\theta(\vec{R}_N | \vec{S}_L) | p(\vec{R}_N)) \right] \right\}$$

may be interpreted as a second rule that aims to minimize the occupied channel capacity, and may be referred to as the minimize information bottleneck target, or the upper boundary of mutual information target. The information bottleneck may be expressed as the mutual information between $\vec{S}_L$ and $\vec{R}_N$ from an encoder $q_\theta(\vec{R}_N | \vec{S}_L)$ point of view:

$$I(\vec{S}_L, \vec{R}_N) = \int_{\vec{S}_L} \int_{\vec{R}_N} q_\theta(\vec{S}_L, \vec{R}_N) \cdot \ln\left(\frac{q_\theta(\vec{S}_L, \vec{R}_N)}{p(\vec{S}_L) \cdot p(\vec{R}_N)}\right) \cdot d\vec{R}_N \cdot d\vec{S}_L =$$

$$\int_{\vec{S}_L} \int_{\vec{R}_N} q_\theta(\vec{R}_N | \vec{S}_L) \cdot p(\vec{S}_L) \cdot \ln\left(\frac{q_\theta(\vec{R}_N | \vec{S}_L)}{p(\vec{R}_N)}\right) \cdot d\vec{R}_N \cdot d\vec{S}_L =$$

$$\int_{\vec{S}_L} p(\vec{S}_L) \left( \int_{\vec{R}_N} q_\theta(\vec{R}_N | \vec{S}_L) \cdot \ln\left(\frac{q_\theta(\vec{R}_N | \vec{S}_L)}{p(\vec{R}_N)}\right) \cdot d\vec{R}_N \right) \cdot d\vec{S}_L =$$

$$\int_{\vec{S}_L} p(\vec{S}_L) (KL(q_\theta(\vec{R}_N | \vec{S}_L) | p(\vec{R}_N))) \cdot d\vec{S}_L$$

The Monte-Carlo method may be applied to $\vec{S}_L$ samples, to arrive at:

$$I(\vec{S}_L, \vec{R}_N) = E_{\vec{S}_L \sim p(\vec{S}_L)} [KL(q_\theta(\vec{R}_N | \vec{S}_L) | p(\vec{R}_N))]$$

Thus, for a given capacity limitation, the aim is to minimize $I(\vec{S}_L, \vec{R}_N)$.

A discussion of the features that may be encoded for transmission is now presented. A feature that may be transmitted (instead of the raw source information) is a description of a probability (e.g., Gaussian) distribution, such as an expectation value and a variance value (or a standard deviation value). A sensor may quantize the expectation values, and transmit this information using a transmission scheme whose configuration may be based on the variance value—that is, transmission scheme that is used for transmitting the expectation value is a function of the variance value associated with that expectation value. Accordingly, the receiver may use the transmission scheme to determine the variance value associated with the expectation values. The feature decoder may decode the raw information (e.g., using a feature decoder DNN) based on the features (e.g., likelihood distributions).

Although the present disclosure describes the probability distributions as Gaussian distributions, it should be understood that this is not intended to be limiting. For example, the probability distributions may be Bernoulli distributions.

The use of expectation and variance values as the transmitted features may be simplified by the use of background knowledge or prior knowledge about the observed subjected. This background or prior knowledge may be considered common information known to both the feature encoder and feature decoder. The common information may be aligned between the feature encoder and the feature decoder (e.g., via training of DNNs during an initiation phase), such that both the feature encoder and the feature decoder know the same common information. The feature encoder may then rely on the common information being known to the feature decoder and may need to only encode feature information that differs or builds on the common information.

A probability distribution defines a tolerable range of samples. A slight change in the observed subject may cause a change in the raw information observed by an ED, but may still fall within the probability distribution. For example, the probability distribution may be common information shared between a feature encoder and a feature decoder. If samples x1, x2 and x3 fall within the probability distribution defined by the common information, the feature encoder may determine that there is no change to the probability distribution and thus no feature needs to be encoded and transmitted. On the other hand, if samples x4 and x5 fall outside of the probability distribution, the feature encoder encodes these samples for transmission. The encoded features may be an update of the distribution (e.g., a new expectation value and new variance, calculated based on the samples x4 and x5) and the feature decoder may use this information to update the probability distribution.

Using common information in the manner may enable transmission of information that is more robust (e.g., against a noisy and hostile channel) than transmitting every sample. The Shannon capacity limit theory assumes that two data blocks or even every single bit in one data block, are independently distributed. Therefore, the Shannon capacity limit does not take into account the possibility of structural and/or logical relevance among the information (e.g., correlation of information along the time axis) and among multiple encoders related to the same information source. In examples discussed herein, by selectively transmitting some features and not transmitting others, the channel efficiency would be improved.

Figure 5C:
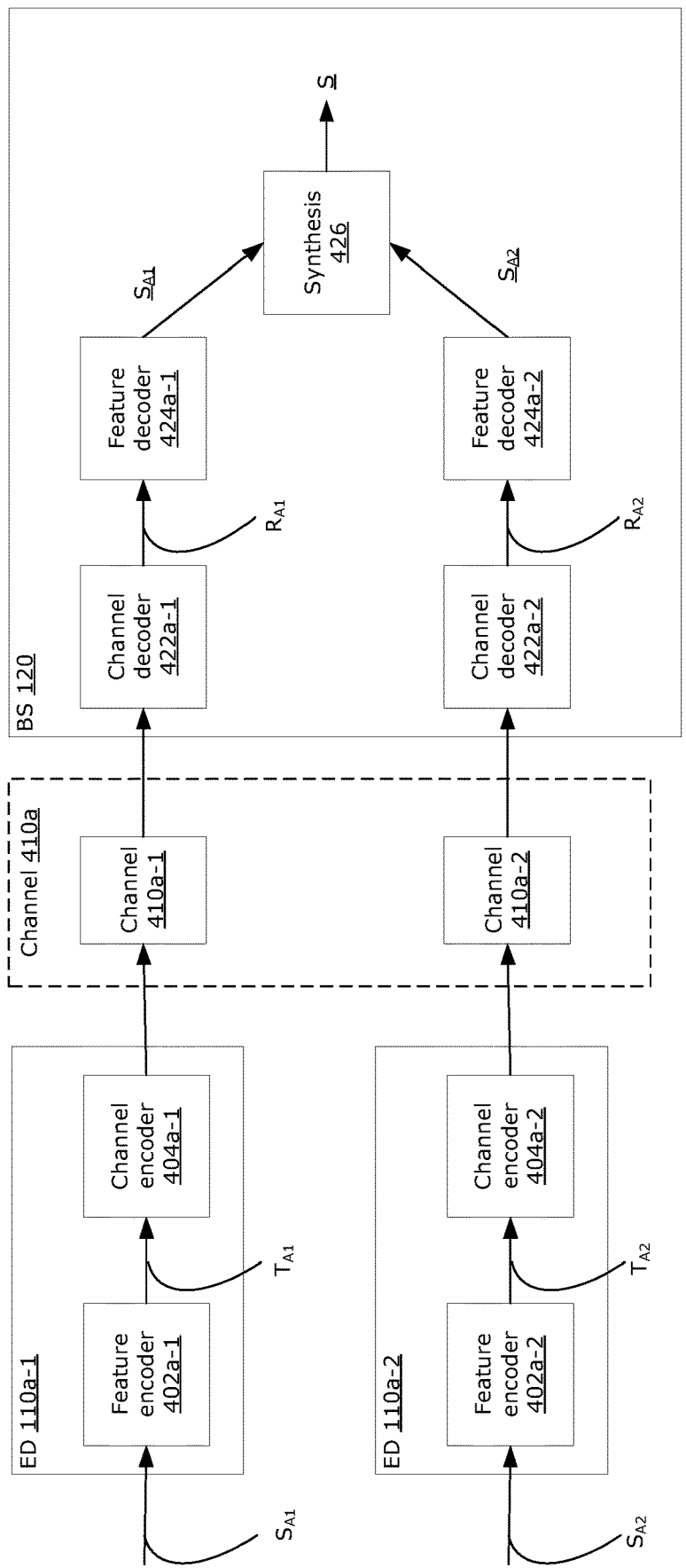
FIG. 5C illustrates an example model for training encoder and decoder DNNs for a plurality of EDs transmitting to the BS.

FIG. 5C illustrates a model for training the feature encoder and feature decoder DNNs in the case where there are more than one transmitting ED. In this example, there are two transmitting EDs 110a-1 and 110a-2, however it should be understood that this model can be extended to any number of transmitting EDs 110a. Both EDs 110a-1, 110a-2 monitor and collect information about the same subject. The EDs 110a-1, 110a-2 may collect information of the same type (e.g., both collect video information, or both collect audio information), in which case the EDs 110a-1, 110a-2 may be referred to as being "homogeneous". In other examples, the EDs 110a-1, 110a-2 may collect information of different types (e.g., ED 110a-1 collects video information and ED 110a-2 collects audio information), in which case the EDs 110a-1, 110a-2 may be referred to as being "heterogeneous". Training may be performed on a per-type basis, as discussed further below. For the purpose of the present discussion, it may be assumed that the EDs 110a-1, 110a-2 are trained together.

The EDs 110a-1, 110a-2 have similar components, namely respective feature encoders 402a-1, 402a-2 and respective channel encoders 404a-1, 404a-2. At the ED 110a-1, the feature encoder 402a-1 encodes the set of raw information $S_{A1}$ into the set of features $T_{A1}$. Similarly, at the ED 110a-2, the feature encoder 402a-2 encodes the set of raw information $S_{A2}$ into the set of features $T_{A2}$. It should be noted that, for simplicity, the dimensional subscript is omitted here. However, it should be understood that, as discussed above, the dimensionality of the features is reduced from the dimensional of the raw information. It should be noted that although each ED 110a-1, 110a-2 monitors the same subject, the collected raw information may be different (e.g., due to different sensing capabilities and/or viewing angle). Each ED 110a-1, 110a-2 is allocated a respective channel capacity, channel 410a-1 and channel 410a-2, respectively. The respective allocated channel capacities together must be within the total allocated channel capacity of the total UL channel 410a. At the BS 120, respective channel decoders 422a-1, 422a-2 decode transmissions from each ED 110a-1, ED 110a-2 into respective sets of received features $R_{A1}$ and $R_{A2}$. The channel decoders 422a-1, 422a-2 may be implemented together (e.g., in the receiver of the BS 120) or separately. The received features are decoded by respective feature decoders 424a-1, 424a-2 (which may be multiple instances of the same feature decoder, or may be implemented using a single feature decoder) into respective sets of recovered information $\underline{S}_{A1}$ and $\underline{S}_{A2}$. The BS 120 performs synthesis 426 (or convergence) of the recovered information to generate a single converged set of recovered information $\underline{S}$.

The joint optimization discussed above may be extended to the model of FIG. 5C. For the transceiver chain involving the ED 110a-1, the ML training target is to maximize likelihood between S (i.e., the converged recovered information) and $S_{A1}$, and the KL training target is to minimize the upper boundary of mutual information between $R_{A1}$ and $T_{A1}$. For the transceiver chain involving the ED 110a-2, the ML training target is to maximize likelihood between S (i.e., the converged recovered information) and $S_{A2}$, and the KL training target is to minimize the upper boundary of mutual information between $R_{A2}$ and $T_{A2}$. Notably, the minimization target aims to keep the upper boundary of the mutual information to be within the capacity of each respective channel allocation 410a-1, 410a-2. This will inherently be within the total capacity of the UL channel 410a.

After the UL transceiver chain(s) have been trained, training is performed for the DL transceiver chain(s).

Figure 6:
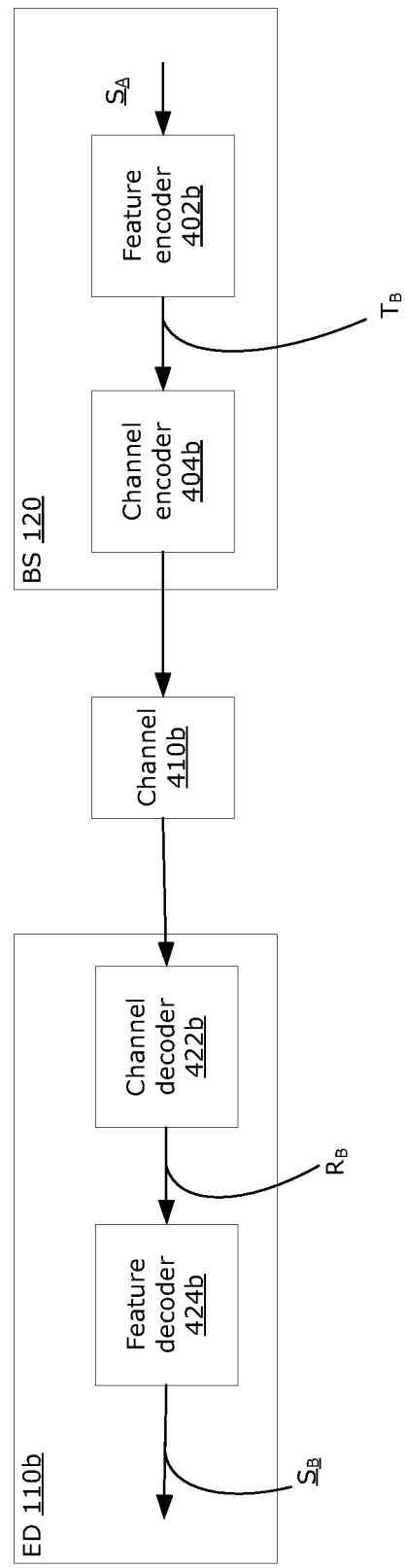
FIG. 6 illustrates an example model for training encoder and decoder DNNs for the transceiver chain from the BS to the receiving ED.

FIG. 6 illustrates a model that may be used for training a machine-learning based implementation of the DL transceiver chain. For the purpose of training, a feature encoder 402b is modeled in the BS 120. The feature encoder 402b may be included in actual implementation in the BS 120 (e.g., as part of the translator 140) or may not be used in actual implementation.

The DL transceiver chain may be trained in a similar manner to the UL transceiver chain, but in the reverse direction and starting with the recovered information $\underline{S}_A$ from the UL transceiver chain as the input for training. In this case, the feature encoder 402b at the BS 120 encodes $\overline{S}_A$ into the set of features $T_B$. It should be noted that, for simplicity, the dimensional subscript is omitted here. However, it should be understood that, as discussed above, feature encoder 402b performs dimensional reduction (i.e., compression). The transmission passes through the DL channel 410b (which has a certain allocated channel capacity limit). At the receiving ED 110a, the channel decoder 422b decodes the transmission into a sets of received features $R_B$. The received features are decoded by the feature decoder 424b into a sets of recovered DL information $\underline{S}_B$.

The joint optimization discussed above may be extended to the model of FIG. 6. The ML training target is to maximize likelihood between $\underline{S}_B$ and $S_A$ (i.e., the original collected raw information from the UL transceiver chain). The KL training target is to minimize the upper boundary of mutual information between $R_B$ and $T_B$. Notably, the minimization target aims to keep the upper boundary of the mutual information to be within the capacity limit of the channel 410b.

For training the DL transceiver chain, the recovered information $\underline{S}_A$ (or the converged recovered information $\underline{S}$ in the case where there are multiple transmitting EDs) is used as the input for training. The recovered information may be generated as part of the training for the UL transceiver chain, and stored (e.g., in a memory of the BS 120) as training samples for training the DL transceiver chain. The raw information $S_A$ collected for training of the UL transceiver chain may also be stored (e.g., in a memory of the BS 120), for the purpose of the ML training target.

If there are multiple receiving EDs 110b, the DL transceiver chain for each ED 110b may be trained separately, using the model of FIG. 6.

Returning to FIG. 5A an approach for sub-channelization is now discussed. So far, the probabilistic encoder $q_\theta(\vec{R}_N|\vec{S}_{L\,L})$ accounts for three components: the information representation scheme (used at the feature encoder 402a), the transmission scheme (implemented at the channel encoder 404a and channel decoder 422a), and the channel 410a. If using an existing standard, most existing standards define a limited set of candidate configurations for the transmission scheme. A new L1 transmission scheme cannot be created, but a suitable transmission scheme can be selected from the defined candidate configurations. Although the channel 410a cannot be controlled, a well specified L1 transmission scheme may help mitigate against negative effects (e.g., noise) from the channel 410a. For example, the transmission scheme can be used to monitor the status of the channel 410a, add sufficient reference signals for the channel decoder 422a to perform channel estimation, equalize fading and selective factors out, and allocate appropriate configurations such as MCS and waveform to mitigate against the monitored channel conditions.

The effects of the channel encoder 404a, channel 410a, and channel decoder 422a may be simplified into an operation that adds white noise to the transmitted features, where the added noise level is a function of MCS, power controlling, and waveform.

As $q_\theta(\vec{R}_N|\vec{S}_{L\,L})$ generates an N-dimensional $R_N$ sample from N different Gaussian distributions for $p_\phi(\vec{S}_{L\,L}|\vec{R}_N)$, to form one of the Gaussian distributions $\sim N(\mu_i, \Omega_i)$ at the latent layer $R_N$ (where $\Omega_i$ denotes a value of a variance vector $\sigma$), the feature encoder can transmit the expectation value pi onto one physical channel over which a white noise $\sim N(0, \Omega_i)$ is added, resulting in $N(\mu_i, \Omega_i) = \mu_i + N(0, \Omega_i)$ for $p_\phi(\vec{S}_{L\,L}|\vec{R}_N)$. The noise level should be consistent with the variance $\Omega_i$. As previously noted, the effective SNR may be controlled by using an appropriate transmission scheme that defines the MCS, transmission power, and waveform. Accordingly, the variance $\Omega_i$ is embodied in the selection of the transmission scheme.

That is, $q_\theta(\vec{R}_N|\vec{S}_{L\,L})$ can be divided into a feature encoder DNN for the information representation scheme that maps the L-dimensional set of raw information $S_L$ to the N-dimensional set of features $T_N$, and a number of sub-channels to realize additive noise with the variances for the N-dimensional set of received features $R_N$. Sub-channelization is an efficient method to exploit the physical channel. In sub-channelization, instead of transmitting one information block over one channel, the transmitting ED divides the features over several sub-channels, each of which has a respective transmission scheme.

In many cases, a wireless standard defines a set of candidate physical layer transmission schemes. The $q_\theta(\vec{R}_N|\vec{S}_{L\,L})$ and $p_\phi(\vec{S}_{L\,L}|\vec{R}_N)$ learning architecture trains a feature encoder DNN to extract the features from the raw information, and to select and configure proper sub-channels to transmit the features. The feature encoder DNN also separates the features for the sub-channelization and weights the importance of the features for the proper configuration of sub-channels. The learning architecture also trains a decoder DNN to recover the information from the received features.

Figure 7A:
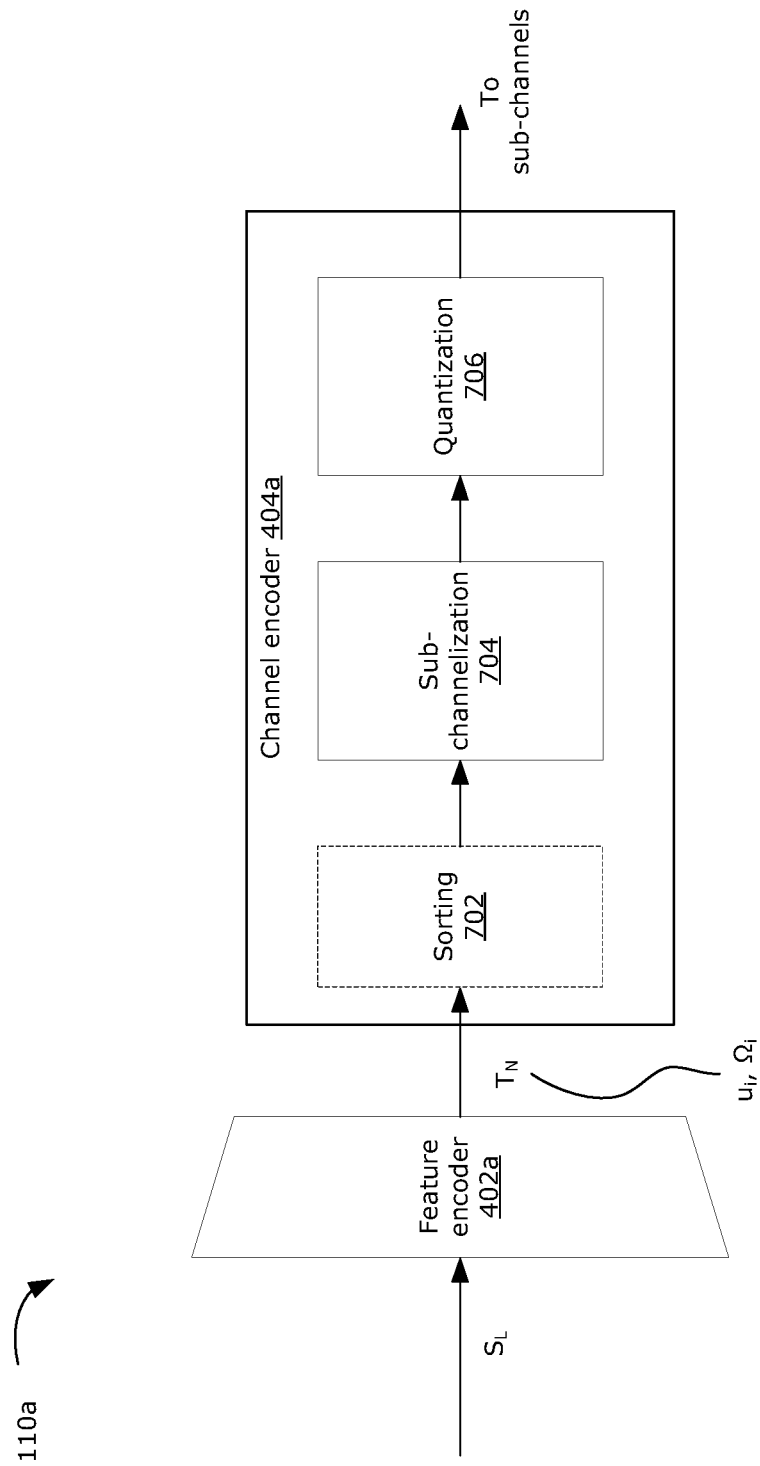
FIG. 7A illustrates an example implementation of a channel encoder implementing sub-channelization in a transmitting ED.

FIG. 7A illustrates an example implementation of a feature encoder 402a and channel encoder 404a in a transmitting ED 110a. The channel encoder 404a implements a sub-channelization transmission scheme. The raw information $S_L$ (which can be any format) is sensed by the transmitting ED 110a and input into the feature encoder 402a (which implements the probabilistic encoder $q_\theta$). The feature encoder 402a outputs the set of N features $T_N$. Because each feature is a Gaussian distribution, each feature can be represented by an information pair comprising an expectation value $\mu_i$ and a variance value $\Omega_i$ (where i is the index of the i-th feature among the N features). Optionally, the channel encoder 404a may implement a sorting function 702 that sorts the N features according to their respective the variance values $\Omega_i$, in increasing or decreasing order. It should be noted that the variance value $\Omega_i$ is indicative of the relative importance of the corresponding feature. Generally, a more important feature is one that has a lower variance value. In some examples, two or more features with similar variance values can be merged. For example, if two features $<\mu_i, \Omega_i>$ and $<\mu_j, \Omega_j>$ have different expectation values ($\mu_i \neq \mu_j$) but similar variances ($\Omega_i \neq \Omega_j$), the two features may be merged into the pair $<(\mu_i, \mu_j), \Omega_i>$. Two variance values may be considered to be similar if the two values fall within a predefined range (e.g., within +/−5% of each other). Merging features with similar variance values may enable more channel coding gain.

The channel encoder 404a then assigns sub-channels to different features (or merged features) according to the respective variance values, using a sub-channelization function 704. The sub-channelization function 704 assigns those features having smaller variance values (which may correspond to the features that area considered more important) to more robust physical layer sub-channels; and assigns those features having larger variance values (which may correspond to the features that are considered less important) to less robust physical layer sub-channels. This sub-channelization may help to use the physical layer capacity more efficiently. It should be noted that the importance level of features may depend on the application. In some cases, the features with larger variance may be considered to be more important (and hence assigned to more robust sub-channels) because those features contain more uncertainty. The robustness of a sub-channel may depend on the configuration of that sub-channel. For example, a sub-channel may be considered robust if the MCS, waveform and transmission power configured for that sub-channel are generally robust (e.g., less susceptible to noise). Most existing standards (e.g., in 3G, 4G and 5G) include MCS tables that define the correspondence between the range of SNR values (which may be sometimes indicated by block error rate (BLER)) and the MCS (and waveform), therefore the above-described approach may be implemented with existing standards, as well as future standards. In general, the configuration of a sub-channel is related to the variance value of the feature carried in that sub-channel. In particular, the configured MCS for a sub-channel may be selected such that the SNR associated with that MCS matches the variance value of the feature carried in that sub-channel.

The channel encoder 404a may generate a control message or header containing information about the configuration of each sub-channel. The control message or header is transmitted after the sub-channels have been configured. The control message may be transmitted separately from transmission of the feature information (e.g., via a separate control channel) or the header may be transmitted as a header of the feature transmission. The control message or header provides information to the receiver (e.g., at a receiving BS) for decoding the transmission. As discussed above, the MCS used for a given sub-channel is determined by the instant variance value of the feature assigned to that sub-channel, and the assignment of a feature to a particular sub-channel is also dependent on the instant variance value of that feature. Because the variance values of features can change over time, the assignment of features to sub-channels can change over time (e.g., from one data block to the next) and the MCS used for a sub-channel can also change over time. The control message or header provides information to the receiver about the MCS and sub-channel combination and order, to enable the receiver to properly decode the information carried in the sub-channels. In some examples, this control message or header may be transmitted (e.g., as the header) for each data block. In other examples, the control message or header may be omitted (or simplified) for a data block if the sub-channel configuration and assignment has not changed from a previous data block.

The channel encoder 404a performs quantization on the expectation values $\mu_i$ using a quantization function 706. The quantization may be performed according to the optimized transmission scheme (e.g., optimized by machine learning). The quantized values are placed on the respective assigned physical sub-channels having respective configurations dependent on the variance value $\Omega_i$, and transmitted over the sub-channels.

Figure 7B:
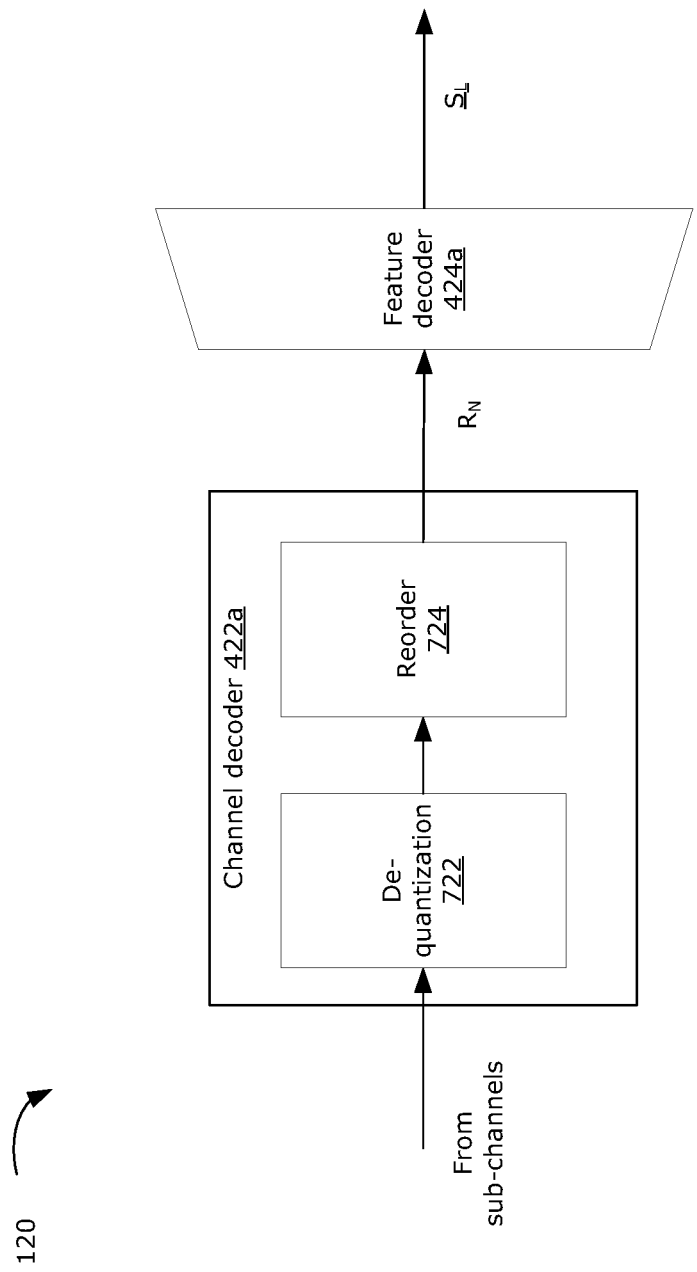
FIG. 7B illustrates an example implementation of channel decoder in a base station, for receiving sub-channelized transmissions.

FIG. 7B illustrates an example implementation of a channel decoder 422a and a feature decoder 424a in a BS 120.

As previously mentioned, the feature order, feature merge (if performed), quantization, and sub-channelization information are encoded into a control message or header and transmitted as a header or as an independent control message. The BS 120 uses this control/header information to prepare its physical layer channel decoder 422a to decode these sub-channels properly and to output an N-dimensional latent layer $R_N$ for the feature decoder 424a. In the example shown, the channel decoder 422a uses a de-quantization function 722 to undo the quantization performed at the channel encoder 404a. The channel decoder 422a then uses the information from the control message or header to perform a reorder function 724 that reorders the information received in the sub-channels into the appropriate order for $R_N$. The reordered set of received information $R_N$ is then inputted to the feature decoder 424a to be decoded into the set of recovered information $\underline{S}_L$.

It should be noted that the assigning of sub-channels to features may be different for different transmitting EDs 110a. For example, one feature of the observed subject may be well detected by a first ED 110a-1, but poorly detected by a second ED 110a-2. Accordingly, the quality and importance of that feature may differ between the two EDs. The first ED 110a-1 may thus assign a robust sub-channel for transmission of that feature, but the second ED 110a-2 may assign a less robust sub-channel for transmission of the same feature. Each ED may transmit a respective control message or header to the BS 120 to inform the BS 120 about placement of the feature on the different sub-channels.

The sub-channelization discussed above, in the context of UL transmissions from the transmitting ED 110a to the BS 120, may also be implemented for DL transmissions from the BS 120 to the receiving ED 110b. For example, the sorting, sub-channelization and quantization performed at the UL channel encoder 404a (at the transmitting ED 110a) may be similarly performed at the DL channel encoder 404b (at the BS 120). The de-quantization and reordering performed at the UL channel decoder 422a (at the BS 120) may be similarly performed at the DL channel decoder 422b (at the receiving ED 110b).

The above description discloses a machine-learning based approach for designing a feature encoder DNN and feature decoder DNN, which is able to account for the effects of the channel, and does not require knowledge about the source information. The feature encoder and feature decoder are both probabilistic, meaning that they encode/decode probabilistic distributions rather than any particular sample from the raw information. The information representation scheme and transmission scheme are selected based on features extracted from the source information, where the features represent probability distributions. For example, the features may represent Gaussian distributions (or Bernoulli distributions). The transmitted features may be quantized expectation values representing the distributions, and the transmission schemes used for transmission of respective features may be L1 configurations corresponding to noise variance values that match the variance values of the respective features.

Both the encoder and decoder DNNs may be trained as a DNN pair, with joint optimization goals. As discussed above, one goal is to maximize the likelihood (which may be considered a kind of entirety or fidelity metric) between the raw information and the recovered information; and another goal is to minimize the mutual information between the transmitted features and the received features. This joint optimization aims to design the encoder and decoder DNNs to use the minimum physical channel capacity to reach the maximum likelihood.

It should be noted that the probabilistic machine-learning based approach disclosed above many enable encoding/decoding and transmission of any feature-driven information, without requiring prior knowledge about the raw information. It is not necessary to know the format and organization of the raw information, for example. Rather, raw information may be used as training samples for training the encoder and decoder DNNs and for configuring the physical layer sub-channels.

An example method for training the feature encoder and feature decoder DNNs is now described in greater detail. The method discussed below may be used for training the UL transceiver chain, as well as the DL transceiver chain. It is assumed that a certain channel capacity is available (e.g., purchased by the service provider) for the UL transmission, and for the DL transmission. Each ED may have a respective allocated channel capacity limit. No information about the format or data organization or inherent structure of the raw information is available to the wireless network. It should be pointed out that, if any such information is available, then such prior information may be used to help configure the DNNs' architectures. For example, if some inherent structures of the source information of the subject are known a priori, the architecture of the DNN, for example the graph topology of a GNN, may be designed for training and/or simplification purposes. In general, although the present disclosure describes examples with reference to DNNs, any suitable neural network architecture may be used. For example, a GNN may a useful architecture for extracting features (or textures), because such a neural network may benefit from some a priori knowledge about the structure of the raw information.

Figure 8:
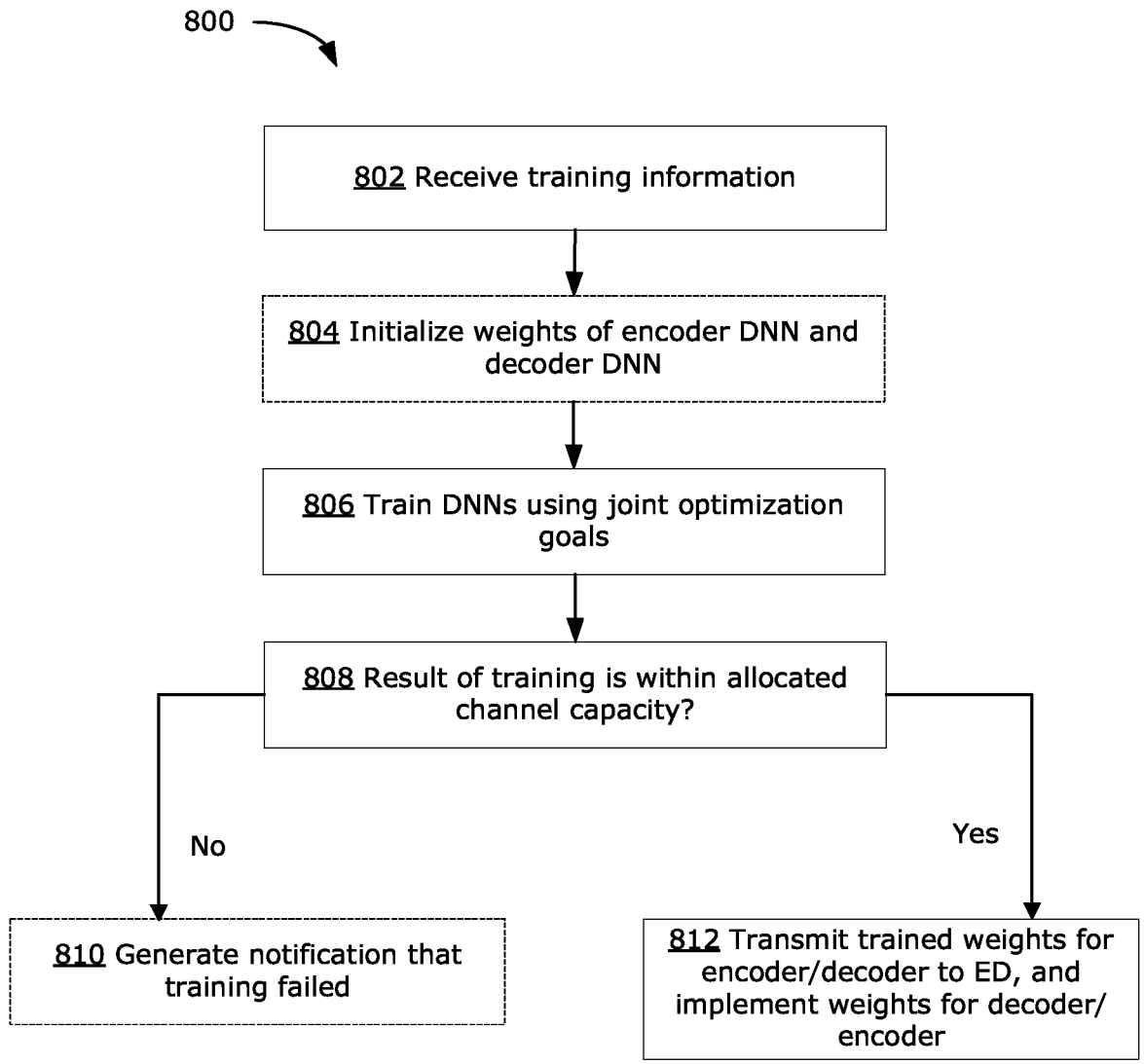
FIG. 8 shows a flowchart illustrating an example method for training an encoder and decoder DNN pair.

FIG. 8 shows a flowchart illustrating an example method 800 for training and implementation of the DNNs. In the context of FIG. 1, the method 800 may be implemented at the core network 130, for example at the BS 120. The BS 120 may perform both the UL training as well as the DL training. In some examples, the UL training may be performed at the transmitting ED 110a and/or the DL training may be performed at the receiving ED 110b. It should be noted that, in this example, training of the DNNs is performed on a per-subject basis. The architecture of DNNs may be chosen on a per-subject basis as well. If there is significant statistical change in the observed subject 105, the training may need to be repeated in order to update the weights of the DNNs. The method 800 may take place during an initiation phase. As discussed above, training of the DNNs aims to satisfy two targets: to maximize likelihood between the source information and the recovered information (i.e., achieve ML target); and to minimize the information bottleneck to save the physical resource (i.e., achieve KL target). The two targets may be thought of as being in opposition to each other because in order to achieve the ML target, it is best to transmit as much information as possible, which opposes the KL target. The training is designed to automatically find the equilibrium among these two adversary targets.

For simplicity, the present discussion will refer to the example where the training is performed at the BS 120. However, it should be understood that this is not intended to be limiting, and steps of the method 800 may be performed elsewhere in the network (e.g., at another component of the core network 130 or other network entity such as at the transmitting ED 110a or the receiving ED 110b). The method 800 will be discussed without specificity to UL or DL training (except as appropriate).

At 802, the BS 120 receives training information. Training information includes raw information that has been collected and transmitted by the transmitting ED 110a about the observed subject 105. For DL training, the training information also includes recovered information outputted at the end of the UL transceiver chain. If the training takes place in another component of the core network 130 or outside of the core network 130 (e.g., at a remote data center 160), the BS 120 may further transmit the training information to the appropriate entity.

The training information may be stored as training samples, for example in a local memory or remote database (e.g., at the remote data center 160) accessible by the BS 120. Training of the encoder and decoder DNNs may be done for one type of information at a time (e.g., visual information, or audio information), in which case the raw information may be collected only from one type of transmitting ED 110a connected with the BS 120. For example, the BS 120 may assign an ED type to each connected ED 110a (or each ED 110a may declare its own type) and may request raw information from one type of ED at a time. Alternatively, the BS 120 may receive raw information from all transmitting EDs 110a regardless of type, and the BS 120 may organize the raw information into separate sets of training samples according to type. Similarly, the recovered information may be organized into separate types, based on the corresponding type of the transmitting ED 110a.

An UL physical capacity $C_{limitA}$ has been allocated for UL transmission of information, and a DL physical capacity $C_{limitB}$ has been allocated for DL transmission of information. There may be separate UL physical capacity limits (e.g., $C_{limitA1}$, $C_{limitA2}$) for each transmitting ED 110a, and separate DL physical capacity limits (e.g., $C_{limitB1}$, $C_{limitB2}$) for each receiving ED 110b. For generality, the physical channel capacity limit, when not specific to UL or DL, will be referred to as $C_{limit}$. As will be discussed further below, it is possible that the allocated physical capacity may not be sufficient to accommodate the transmission of features.

The number of features to be transmitted is N. N may be predetermined. Optionally, N may be determined as part of training. Details of how to determine N will be discussed further below with respect to FIG. 9. It should be noted that, depending on channel capacity, the number of features transmitted UL (which may be denoted $N_A$) may be different from the number of features transmitted DL (which may be denoted $N_B$). Typically, $N_B \leq N_A$. For generality, the number of features, when not specific to UL or DL, will be referred to as N.

Optionally, at 804, initialization is performed. Initialization may include initialization of the architecture (if some prior knowledge about the raw information of the subject is available), the weights θ (also referred to as coefficients, weighting coefficients, or neurons) in the feature encoder DNN $q_\theta(\vec{R}_N | \vec{s}_{L\,L})$, and the weights φ in the feature decoder DNN $p_\phi(\vec{R}_L | \vec{s}_{L\,R})$. The weights θ and φ may be randomly initialized or may be initialized based on some experience/historical values. Based on the determined (or predetermined) N, $C_{limit}$ is shared equally by N sub-channels, such that the capacity of each sub-channel is initially $C_{limit}/N$, which is translated into a noise variance $\sigma_{ch}$. In some examples, such as where the method 800 is being performed to retrain previously trained encoder and decoder DNNs, initialization may not be required and 804 may be omitted. For example, the previously trained DNN weights may be used as the starting point of the training.

At 806, the DNNs are trained, with the training information (received at 802), using the joint optimization goals discussed above. The training may take place iteratively, where the training samples are provided batch by batch.

Training on one batch of training samples is now described. The sample are input into the probabilistic encoder DNN $q_\theta(\vec{R}_N | \vec{s}_{L\,L})$, which outputs N Gaussian distributions as the features $T_N$. Each feature contains an expectation value $\mu_i$ and a variance value $\Omega_i$. The variance value $\Omega_i$ scales a normal distribution $N(0,1)$ into $N(0, \Omega_i)$ that is in turn added onto the expectation value $\mu_i$. Together, the features are used to form an N-dimensional latent layer $R_N \sim N(\mu_i, \Omega_i)$. The encoder DNN $q_\theta(\vec{R}_N | \vec{s}_{L\,L})$ is trained (e.g., using backward propagation) to minimize the mutual information between the raw information $S_L$ and the received features $R_N$. Specifically, the training aims to minimize the KL divergence (which is indicative of mutual information) between $R_N$ and $N(\mu_{cl}, \sigma_{cl})$, where $N(\mu_{cl}, \sigma_{cl})$ is the target distribution for the latent layer $R_N$. The subscript cl indicates the sub-channels that have been divided among the N features. As previously described, during training it is assumed that the sub-channels are equally allocated among the N features, thus $\sigma_{cl}$ represents $C_{limit}/N$. During the training, the aim is for $R_N$ to be as similar to these $N(\mu_{cl}, \sigma_{cl})$ distributions as possible. This setup allows the KL value to be differentiable with respect to θ from $R_N$ back to $S_L$.

The N-dimensional latent layer $R_N$ is provided as input into the decoder DNN $p_\phi(\vec{s}_{L\,L} | \vec{R}_N)$ to generate $\underline{S}_L$. The decoder DNN $p_\phi(\vec{s}_{L\,N} | \vec{R}_N)$ is trained (e.g., using backward propagation) to maximize log likelihood between $S_L$ and $\underline{S}_L$. This setup allows the ML value to be differentiable with respect to φ from $\underline{S}_L$ back to $R_N$.

Training is performed until the ML value satisfies a training criteria (e.g., reaches a threshold value indicating that $S_L$ and $\underline{S}_L$ are very similar to each other, which may be considered a fidelity metric). The method 800 then proceeds to 808.

At 808, a check is performed to determine whether the result of training is within the allocated channel capacity $C_{limit}$. Specifically, the trained KL value is compared against the allocated $C_{limit}$. If the training cannot converge, it is likely due to the allocated channel capacity $C_{limit}$ being insufficient for the observed subject and/or the ML criteria is too high. It should be understood that training of the DNNs is performed to meet both the ML training criteria and the KL criteria equally and together.

At 810, if the training fails (e.g., does not converge), optionally a notification may be generated indicating that training failed. The notification may inform the service provider to either purchase more physical capacity or reduce the resolution of the raw information, for example.

At 812, if the training is successful (e.g., converges and reaches the optimization targets) the trained weights θ and ϕ for both the encoder and the decoder may be stored. For UL training, the weights θ for the encoder are transmitted to the transmitting ED 110a, to enable the transmitting ED 110a to implement the encoder DNN. If the BS 120 implements a feature decoder, the weights ϕ for the decoder are used to implement the decoder DNN at the BS 120. For DL training, the weights ϕ for the decoder are transmitted to the receiving ED 110b, to enable the receiving ED 110b to implement the decoder DNN. If the BS 120 implements a feature encoder, the weights θ for the encoder are used to implement the encoder DNN at the BS 120. The training also allocates sub-channel capacity, such that the sub-channels may have with different capacity and noise.

As previously noted, the encoder and decoder DNNs may be trained on the training information from one type of transmitting ED at a time. Accordingly, transmitting EDs 110a of the same type may implement the same encoder DNN, and the BS 120 may implement different decoder DNNs for decoding information from different types of transmitting EDs 110a. Steps of the method 800 discussed above may be repeated as necessary to train different DNNs for different types of EDs. The initiation phase may end when all encoder and decoder DNN pairs for all transmitting and receiving EDs 110 connected to the BS 120 have been trained. The training results (including design of the architecture if applicable, and coefficients), may be transmitted by the BS to the appropriate EDs 110 via downlink channels, so that the EDs 110 could configure their own feature encoders/decoders accordingly.

The above example provides a trainable mechanism for both the encoder and decoder DNNs. Notably, the effects of the channel is reduced into a transmission of the expectation value with a scaled normal distribution of noise, which is differentiable in the back propagation.

As mentioned above, in some examples the number of features N may be predefined. In other examples it may be necessary to determine N as part of DNN training. N is a parameter that indicates the compression ratio (which may also be referenced in terms of the dimension reduction ratio L:N that reduces the L-dimensional raw information to the N-dimensional features). Different Ns would result in different encoder DNN $q_\theta(\vec{R}_N | \vec{s}_{L\ L})$ and decoder DNN $\mu_\phi(\vec{s}_{L\ L} | \vec{R}_N)$. Accordingly, appropriate determination of N may be an important part of training the encoder and decoder DNNs.

Figure 9:
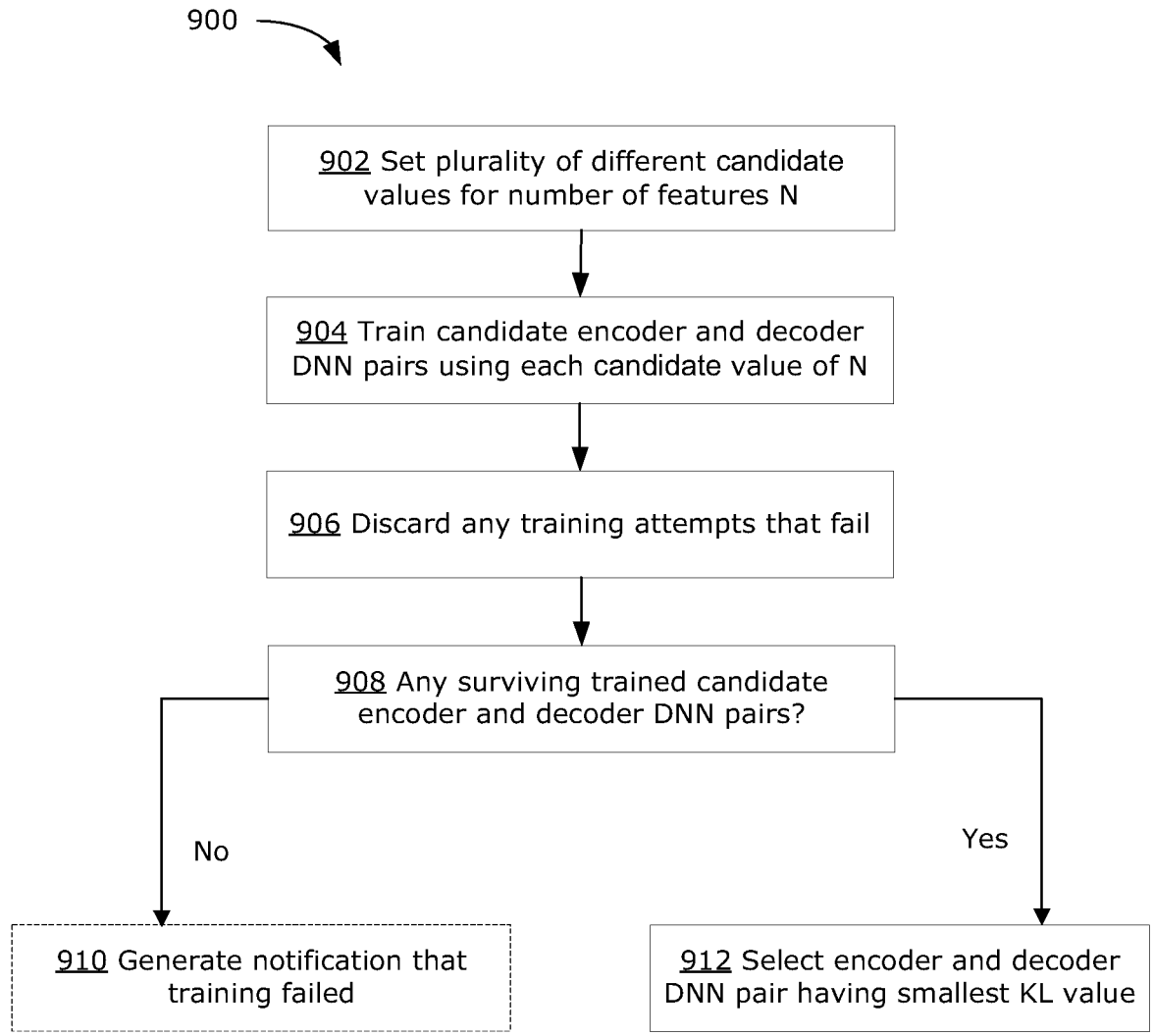
FIG. 9 is a flowchart illustrating an example method 900 for determining an optimal number of features for an encoder and decoder DNN pair.

FIG. 9 is a flowchart illustrating an example method 900 for determining the number of features N. The method 900 may be used to determine the number of features $N_A$ for UL transmission, and may be separately used to determine the number of features $N_B$ for DL transmission. The method 900 may be implemented as part of or together with the method 800 during the initiation phase. Similarly to the method 800, the method 900 may be implemented at the core network 130, such as at the BS 120, or at the transmitting or receiving ED. For simplicity, the method 900 will be discussed using the non-limiting example of implementation at the BS 120. The method 900 will be discussed without specificity to UL or DL training (except as appropriate).

At 902, in absence (or limited information) of any prior knowledge about the raw information, the BS 120 sets a plurality of different candidate values for N, for performing training in parallel. The different candidate values for N may be set to reflect a range of compression ratios, from more compressive to less compressive. For example, the BS 120 may select a range of candidate values ranging from a compression ratio of 0.2 to 0.8, among other possibilities.

At 904, each candidate value of N is used to independently train a respective candidate encoder and decoder DNN pair. Each candidate DNN pair provides a respective compression ratio (depending on the associated candidate value of N). For example, the training may be performed using steps 804-808 discussed above. The training of each candidate DNN pair is performed using the same training samples.

At 906, any training attempts that fail (e.g., training does not converge on KL and/or ML targets are discarded. In particular, any candidate values of N associated with the failed training attempts are discarded.

At 908, it is determined whether there is any surviving trained candidate encoder and decoder DNN pair that is successful (i.e., satisfies joint optimization goals, and within allocated channel capacity).

At 910, if there are no survivors, optionally a notification may be generated indicating that training failed. Having no survivors may indicate that the allocated channel capacity is too low and/or the ML criteria is too high. Accordingly, the notification may optionally inform the service provider to either purchase more physical capacity or reduce the resolution of the raw information, for example.

At 912, if the training is successful for at least one candidate encoder and decoder DNN pair, the candidate encoder and decoder DNN pair having the smallest KL value is selected as the encoder and decoder DNN pair for implementation. The N value associated with the selected encoder and decoder DNN pair is the N value resulting in the optimal compression ratio L:N. This N value is selected for implementing the DNNs, and is the N value that enables minimum physical capacity and also meets the ML criteria. In the special case where there is only one candidate encoder and decoder DNN pair that is successfully trained, that one DNN pair (and its associated N value) may be selected without considering the KL value.

The trained weights θ and ϕ for the selected encoder and decoder DNNs may be stored and/or transmitted, using step 812 described above.

After the encoder and decoder DNNs have been trained and the weights implemented at the appropriate EDs 110 and BS 120, the monitoring phase may begin. During the monitoring phase, each transmitting ED 110a collects raw information and uses the trained encoder DNN to extract and encode features or textures (e.g., expectation and variance values representing probability distributions), and transmit to the BS 120 over UL sub-channels. The BS 120 translates the features for transmission to the receiving ED(s) 110b over DL sub-channels. Each receiving ED 110b uses the trained decoder DNN to decode and recover the information. The recovered information may then be further processed (e.g., inputted to another application to make a machine-based decision). In some cases in which the further processing is done by a machine, the received features $R_B$, which represent distributions, may be directly sent to that machine (which may be interested in certain features and/or certain combinations of the features).

The training may be repeated, for example when there is a significant change in the observed subject, significant change in the transmitting EDs and/or significant change in the information required by the applications at the receiving EDs. For example, retraining may be triggered by the DNN itself and/or by an application that detects a degradation in the recovered information. Degradation may be detected as, for example, insufficiency of information for the application to perform a task (e.g., unable to clearly detect license plates of vehicles passing a monitored crossroad). Generally, the need for retraining may be caused by, for example, changes in the surrounding environment (e.g., darkening of ambient light, sudden increase in vehicles/pedestrians/etc.), changes in the channel (e.g., increase in wireless devices entering the area resulting in reduction in available channel capacity), and/or changes in the transmitting EDs (e.g., significant increase/decrease in number of transmitting EDs monitoring a given subject, or significant increase/decrease in sensor capability—such as due to damage, loss of power, or system upgrades), among other possibilities. The application may communicate a request for retraining to the BS.

The DNN may also itself detect a degradation and may cause the BS to internally trigger retraining. The BS may send commands into the control or data downlink channels to the transmitting EDs, to cause the sensors to start collecting and transmitting the raw information, as the start of the retaining process. In some examples, retraining may be triggered by one or more transmitting EDs that observe some degradation in the transmitted features. A transmitting ED may detect degradation in the collected information by detecting unexpected changes in the features extracted from the information. Typically, a transmitting ED would expect features to change gradually (e.g., within an expected range and/or within an expected rate of change). If the transmitting ED detects unexpected changes in the features, such as over a short period the features change outside of the expect scope, features that are expected to be time-invariant becomes highly time-varying, or features are changing rapidly or randomly, this may be indicative of degradation in the collected information. Such degradation may be the result of a dramatic change in the observed subject (for example, a car accident blocking the observed crossroad), or error in the transmitting ED itself (e.g., sensor malfunction or deliberate tampering of the sensor). In response to detection of such degradation, the transmitting ED(s) may send a request for retraining to the network, or the transmitting ED(s) may stop encoding the information and start to send the raw information, to initiate the retraining process. In some examples, retraining may be done periodically. For example, EDs and the BS may have an established schedule for the transmitting EDs to send the raw information to the BS. The transmitting EDs may be scheduled in rotation for transmitting raw information, so that the UL channel is not overwhelmed. The raw information may be received and stored by the BS for the retraining purpose. Retraining may be done periodically, using the received and stored raw information, and initialization of coefficients may be using the current coefficients rather than random values, in order to track the changing subject. After retraining, the BS may decide whether, when, and how to inform the EDs to update the encoder/decoder DNNs (e.g., through DL control or data channels).

As discussed above, both UL and DL communications are feature-driven. According to the feature-driven approach, the transmitting ED(s) extract and transmit a number of features (or textures, or the descriptions of Gaussian distributions) to the BS. In the DL transmission, the receiving ED(s) reconstruct the information from a number of received features (or textures, or descriptions of Gaussian distributions) from the BS.

Typically, the transmitting ED(s) and receiving ED(s) are subjected to different channel conditions (i.e., $C_{limitA} \neq C_{limitB}$). As discussed above, the information representation scheme and transmission scheme (e.g., compression rate, channel coding rate) and overall design of the encoder/decoder DNNs are related to the channel condition. The different UL and DL channel conditions and capacities may result in different compression rates and feature extraction between UL and DL features. For example, if the UL channel has much larger channel capacity than the downlink channel (i.e., $C_{limitA} \gg C_{limitB}$), the optimal compression rate and source encoder for the UL transmission would be different from the DL transmission, such that the features transmitted UL are different from the features transmitted DL. For example, an observation of a subject by the transmitting ED 110a may be extracted into 20 features given an uplink $C_{limitA}$, while only 10 features can be transmitted DL given a downlink $C_{limitB}$. The 20 features transmitted UL and the 10 features transmitted DL represent the same observation about the subject, but with different ML levels (representing different degrees of entirety and fidelity or different granularities). The BS serves to translate the 20 UL features onto the 10 DL features. The translation of features may be a simple mapping (e.g., 2 UL features are averaged to 1 DL feature), or may be more complex. In some examples, the BS may use a DNN to implement the translator, in which case the relationship between any DL feature and any UL feature may be a black box.

Figure 10:
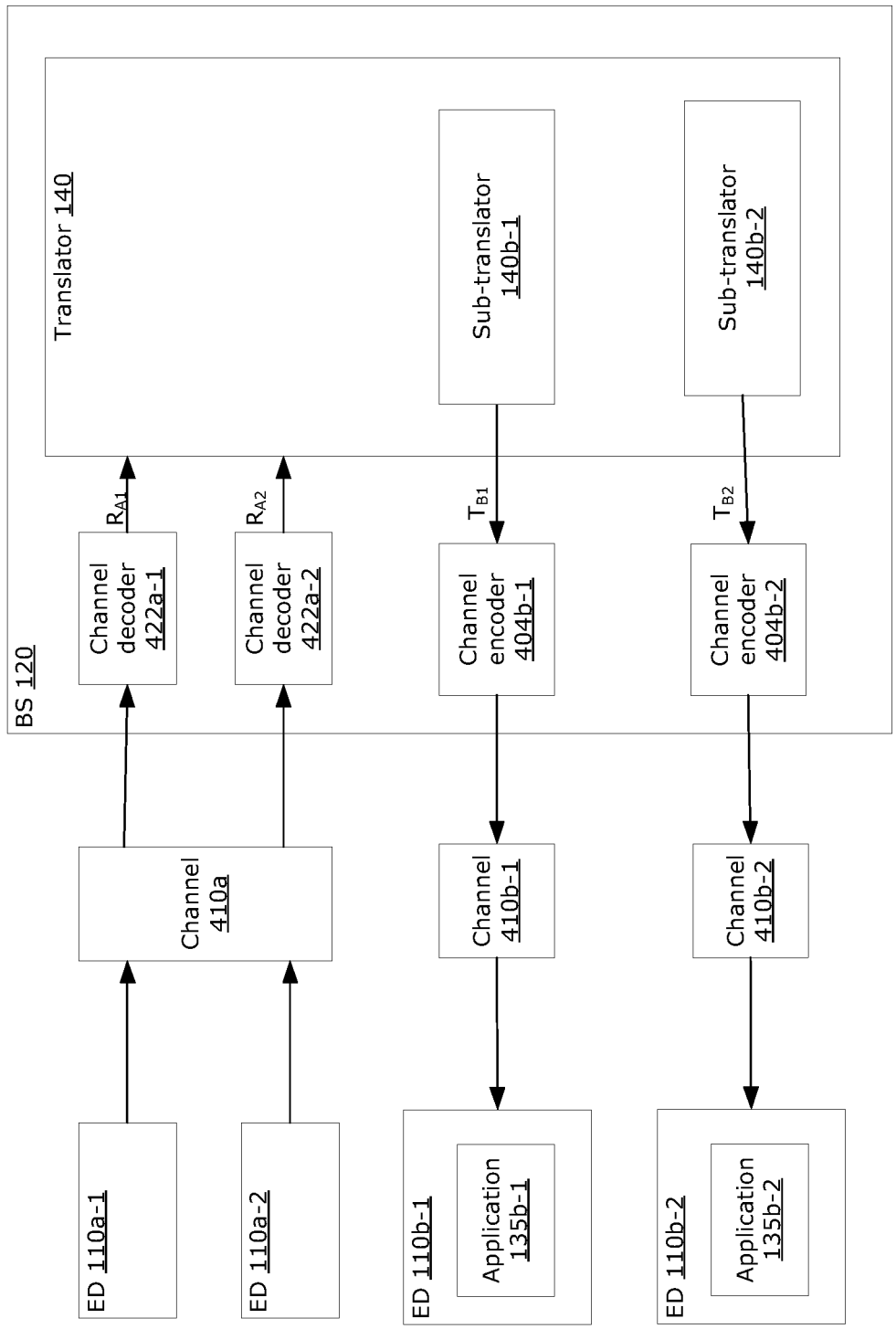
FIG. 10 is a simplified schematic diagram illustrating an example configuration in which there are multiple transmitting EDs and multiple receiving EDs.

FIG. 10 is a schematic diagram illustrating a simplified example configuration in which there are multiple transmitting EDs and multiple receiving EDs. Details of the translator 140 will be discussed with reference to FIG. 10.

In this example, two transmitting EDs 110a-1, 110a-2 and two receiving EDs 110b-1, 110b-2 are shown, however it should be understood that the following discussion may be generalized to any number of transmitting EDs 110a and any number of receiving EDs 110b. The following discussion focuses on translating the received UL features $R_{A1}$, $R_{A2}$ to the transmitted DL features $T_{B1}$, $T_{B2}$.

As shown in FIG. 10, the translator 140 receives the features $R_{A1}$, $R_{A2}$ that have been decoded by the respective channel decoders 422a-1, 422a-2. The translator 140 in this example implements sub-translators to converge and translate these features to respective DL features $T_{B1}$, $T_{B2}$ to be transmitted to each receiving ED 110b-1, 110b-2. The BS 120 uses channel encoders 404b-1, 404b-2 (which may be implemented together in the transmitter of the BS 120, or implemented as separate components) to encode the DL features for transmission over respective DL channels 410b-1, 410b-2. Because the channel capacity limit for each DL transmission may be different, the number of features may be different between $T_{B1}$ and $T_{B2}$. Accordingly, the sub-translator 140b-1 and the sub-translator 140b-2 may be different. The information requested by the applications 135b-1, 135b-2 in each respective receiving ED 110b-1, 110b-2 may also be different. Accordingly, the sub-translator 140b-1 and the sub-translator 140b-2 may also implement different methods for reducing redundancy, as discussed further below.

Figure 11:
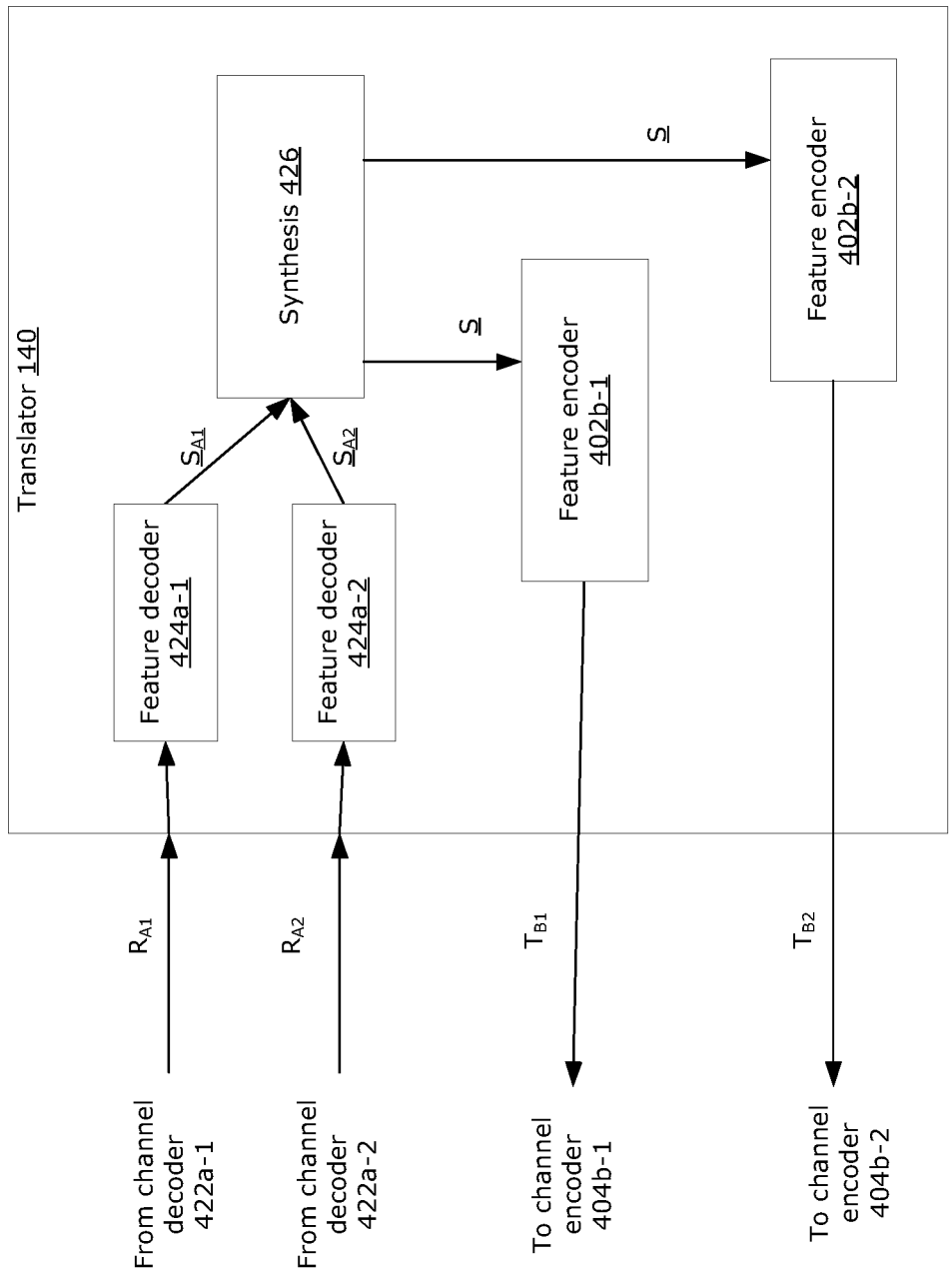
FIG. 11 is a simplified schematic diagram illustrating an example translator implemented using feature encoders and feature decoders.

FIG. 11 illustrates an example implementation of the translator, using feature decoders and encoders. In this example, the translator 140 implements the feature decoders 424a-1, 424a-2 (e.g., using feature decoder DNNs that have been trained during UL training as discussed above) and performs synthesis 426 to generate the converged recovered information $\underline{S}$. The translator 140 them implements the feature encoders 402b-1, 402b-2 (e.g., using feature encoder DNNs that have been trained during DL training as discussed above) to generate the DL features $T_{B1}$, $T_{B2}$ to be transmitted. In this implementation, there may not be a distinct sub-translator 140b-1 and sub-translator 140b-2; rather, the synthesis 426 and feature encoder 402b-1 together may be considered the sub-translator 140b-1, and the synthesis 426 and feature encoder 402b-2 together may be considered the sub-translator 140b-2.

Figure 12:
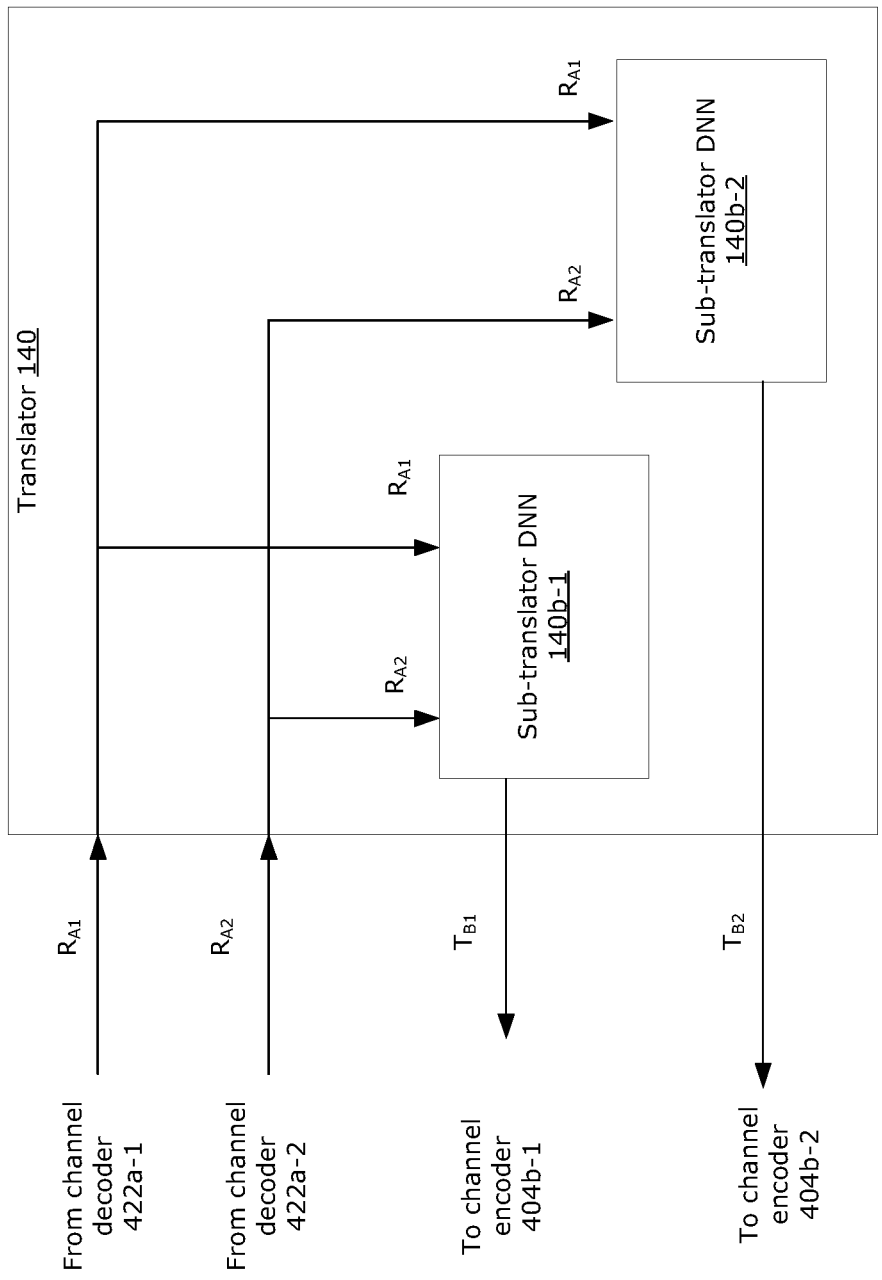
FIG. 12 is a simplified schematic diagram illustrating an example translator implemented using DNNs.

FIG. 12 illustrates another example implementation of the translator, in which feature decoders and encoders are not used for translating UL features to DL features. In this example, the translator 140 uses respective neural networks (e.g., DNN, which may be a GNN, CNN, RNN or any suitable architecture) to implement the sub-translator 140b-1 and the sub-translator 140b-2. The sub-translator DNN 140b-1 may be trained (e.g., during the initiation phase, following training of the encoder and decoder DNNs) to translate the received UL features $R_{A1}$, $R_{A2}$ directly to the DL features $T_{B1}$ to be transmitted to the receiving ED 110b-1. Similarly, the sub-translator DNN 140b-2 may be trained (e.g., during the initiation phase, following training of the encoder and decoder DNNs) to translate the received UL features $R_{A1}$, $R_{A2}$ directly to the DL features $T_{B2}$ to be transmitted to the receiving ED 110b-2.

When the translator 140 is implemented using DNNs, as shown in the example of FIG. 12, the UL feature decoder 424a and DL feature encoder 402b may not need to be implemented at the BS 120. However, the trained weights for the UL feature decoder 424a and DL feature encoder 402b may be stored (e.g., in a memory of the BS 120), for example to be used for retraining purposes and/or for initializing weights in future training.

The example of FIG. 12 may be more efficient than the example of FIG. 11, because there may be less processing involved. The example of FIG. 12 may also be useful for other reasons. For example, because the BS 120 translates the UL features directly to DL features, the BS 120 does not have access to the source information at any point. This may be desirable for privacy and/or security reasons.

It should be noted that, in the special case where there is one-to-one communication between a single transmitting ED 110a and a single receiving ED 110b, the BS 120 may simply act as a relay. In this special case, assuming the DL channel capacity limit $C_{limitB}$ is less than or equal to the UL channel capacity limit $C_{limitB}$, the UL training may be performed using the DL channel capacity limit $C_{limitB}$ as the effective channel capacity limit. The expected result is that the UL and DL features are the same, so that the translator 140 in the BS 120 simply passes the UL features directly to the DL channel encoder.

However, in most applications, such one-to-one communications would be rare. More typical would be the case in which there are multiple transmitting EDs collecting information about one subject, and one receiving ED that is interested in certain aspects of the collected information. The aggregated UL channel capacity over all transmitting EDs would likely be much larger than the DL channel capacity for the receiving ED. Accordingly, it would be desirable for the BS to reduce redundancy in the transmission of DL features, for example by only transmitting features that are requested by the machine application at the receiving ED.

In some cases, there are multiple receiving EDs, each of which is interested in the same subject but having different channel capacities and different applications. Different service providers may be involved. For example, an IoT provider may own and operate a plurality of transmitting EDs (e.g., monitoring a crossroad). The IoT provider purchases an aggregated UL channel capacity $C_{limitA}$ for the transmitting EDs to transmit UL features to the BS (the aggregated UL channel capacity may be divided among the transmitting EDs as appropriate). Different application providers may own and operate different receiving EDs, each implementing different machine applications. Each application provider may purchase a different DL channel capacity $C_{limitB1}$, $C_{limitB2}$, etc. Each application may have different information requirements. For example, when the monitored subject is a crossroad, one application be analyzing traffic density information about features related to colors is not required, another application be identifying cars so that application requires more information about features related to identification (e.g., ability to read a license plate).

Generally, such differences in application requirements may mean that there is redundancy when all receiving EDs are transmitted the same set of features, because a large amount of the DL transmitted features will be ignored. Such redundancy may also occur even when there is a human user instead of a machine application at the receiving ED. For example, a human user may not have the capabilities (or interest, or need) to make use of all the features or textures extracted by a machine.

In these and other such cases of redundancy, the translator at the BS may serve to reduce or filter out the features transmitted DL, which may help improve efficiency of DL channel resources. Some example methods for reducing redundancies, in both UL and DL transmissions, are described below.

As previously discussed, one type of redundancy is time-related redundancy. Time-related redundancy arises when one or more features are substantially time-invariant (for at least a certain time period). It becomes redundant to transmit information about such time-invariant features (for at least the time period). To address this type of redundancy, the EDs and the BS may use respective databases (also referred to as an experience history library) to store historical information about the features transmitted/received between the EDs and the BS.

Figure 13:
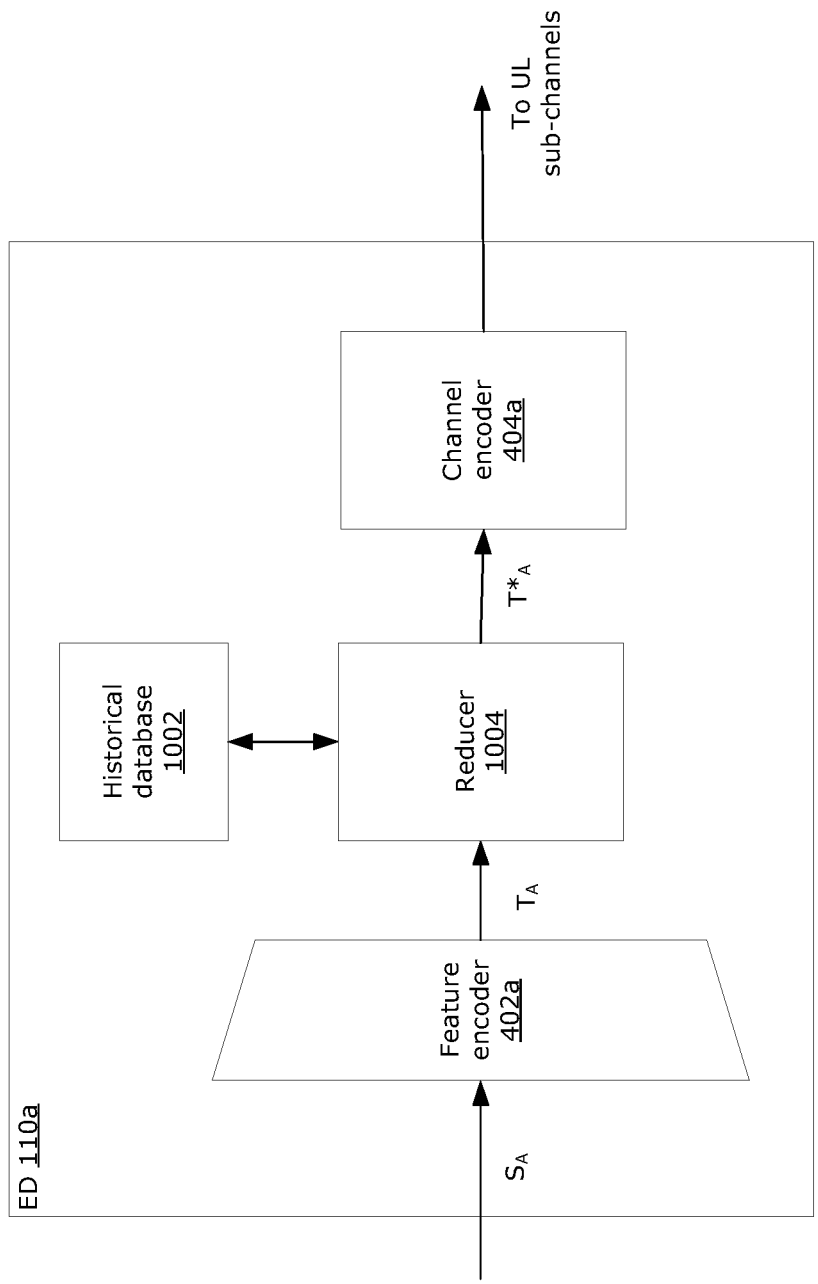
FIGS. 13-15 are schematic diagrams that show example EDs and an example base station that implement methods for reducing redundancy in uplink and downlink transmissions.
Figure 14:
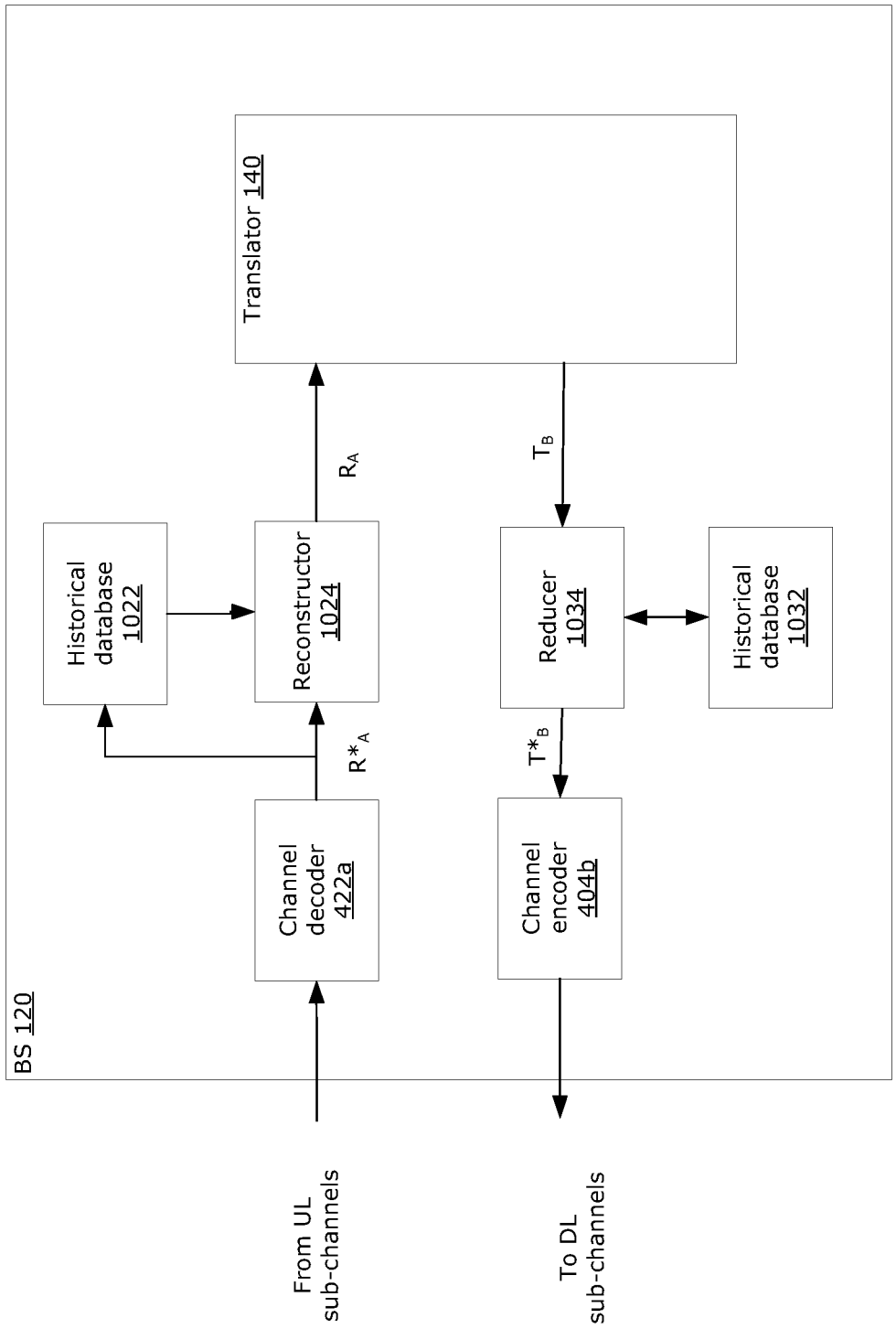

FIGS. 13 and 14 are schematic diagrams that show an example transmitting ED 110a and an example BS 120, respectively, that implement methods for reducing redundancy in an UL transmission of features. It should be understood that the transmitting ED 110a and BS 120 of FIGS. 13 and 14 have been illustrated in a simplified form, for ease of understanding. The various details of implementation as discussed above (e.g., sub-channelization) may be equally application to the examples shown in FIGS. 13 and 14.

The transmitting ED 110a and the BS 120 may each maintain a respective historical database 1002, 1022 containing historical information about UL features. For simplicity, the historical databases 1002, 1022 will be discussed together. However, it should be understood that there may be differences between the historical database 1002 maintained by the ED 110a and the historical database 1022 maintained by the BS 120. For example, there may be differences in the database structure, in how stored information is formatted and accessed, and there may be differences in how the stored information is updated (e.g., the timestamp of the stored information in the historical database 1022 of the BS 120 may be later than the timestamp of the corresponding stored information in the historical database 1002 of the ED 110a, due to transmission latency).

The historical database 1002, 1022 may store the most recently updated expectation value and variance value for each UL feature. Optionally, a timestamp may be used indicate the time of the last update to the stored information.

In operation, the transmitting ED 110a extracts a set of features $T_A$ from the collected information $S_A$, using the feature encoder 402a (which implements the trained encoder DNN). The ED 110a uses a reducer 1004 that attempts to reduce the set of features $T_A$ to a reduced set of features $T^*_A$. The extracted features $T_A$ has N features, for example, and the reduced set of features $T^*_A$ has M features, where M≤N. Although FIG. 13 shows the historical database 1002 and the reducer 1004 as separate components, in some examples the historical database 1002 and/or the reducer 1004 may be implemented together and/or as part of the channel encoder 404a.

The reducer 1004 compares the set of features $T_A$ against the stored information in the historical database 1002. If a feature in the set of features $T_A$ is substantially unchanged (e.g., within a tolerance threshold, such as within +/−5%) from the stored value, then that feature does not need to be transmitted. The reducer 1004 may encode a non-transmission flag into a header or control message for the BS 120, to indicate the particular feature that has been removed from the UL transmission. The header or control message may be transmitted together with or separately from the UL transmission of information. In some examples, the non-transmission flag may be included in the control message or header that provides sub-channelization information as discussed above. The reducer 1004 may further update the historical database 1002 with any updated features and also updates the timestamp (if used). As a result, the set of features $T_A$ is reduced to a reduced set of features $T^*_A$. The reduced set of features $T^*_A$ may then be placed on sub-channels and transmitted by the channel encoder 404a, as discussed above. In some examples, there may not be any reduction of features (e.g., all features may have updates compared to the historical information).

At the BS 120, the header or control message is used to identify which UL features were not transmitted. The channel decoder 422a receives the UL transmission and, using the UL transmission scheme, converts it to the reduced set of M received features $R^*_A$. The features R*A are used to update the information stored in the historical database 1022. If a timestamp is used, the timestamp may be updated. The BS 120 uses a reconstructor 1024 to fill any non-transmitted features, to reconstruct the full set of N received features $R_A$. Although FIG. 14 shows the historical database 1022 and the reconstructor 1024 as separate components, in some examples the historical database 1022 and/or the reconstructor 1024 may be implemented together and/or as part of the channel decoder 422a.

For example, the reconstructor 1024 may use information from the header or control message to identify the non-transmitted UL feature(s) and to retrieve the values for the non-transmitted UL feature(s) from the historical database 1022. The reconstructed set of received features $R_A$ is then inputted to the translator 140 to translate to the set of DL features $T_B$ to be transmitted to the receiving ED 110b. It should be noted that because the translator 140 was designed for a set of N received UL features, the full set of N UL features may be required for proper operation of the translator 140.

A similar method may be used for reduction of time-related redundancies in DL transmissions.

Figure 15:
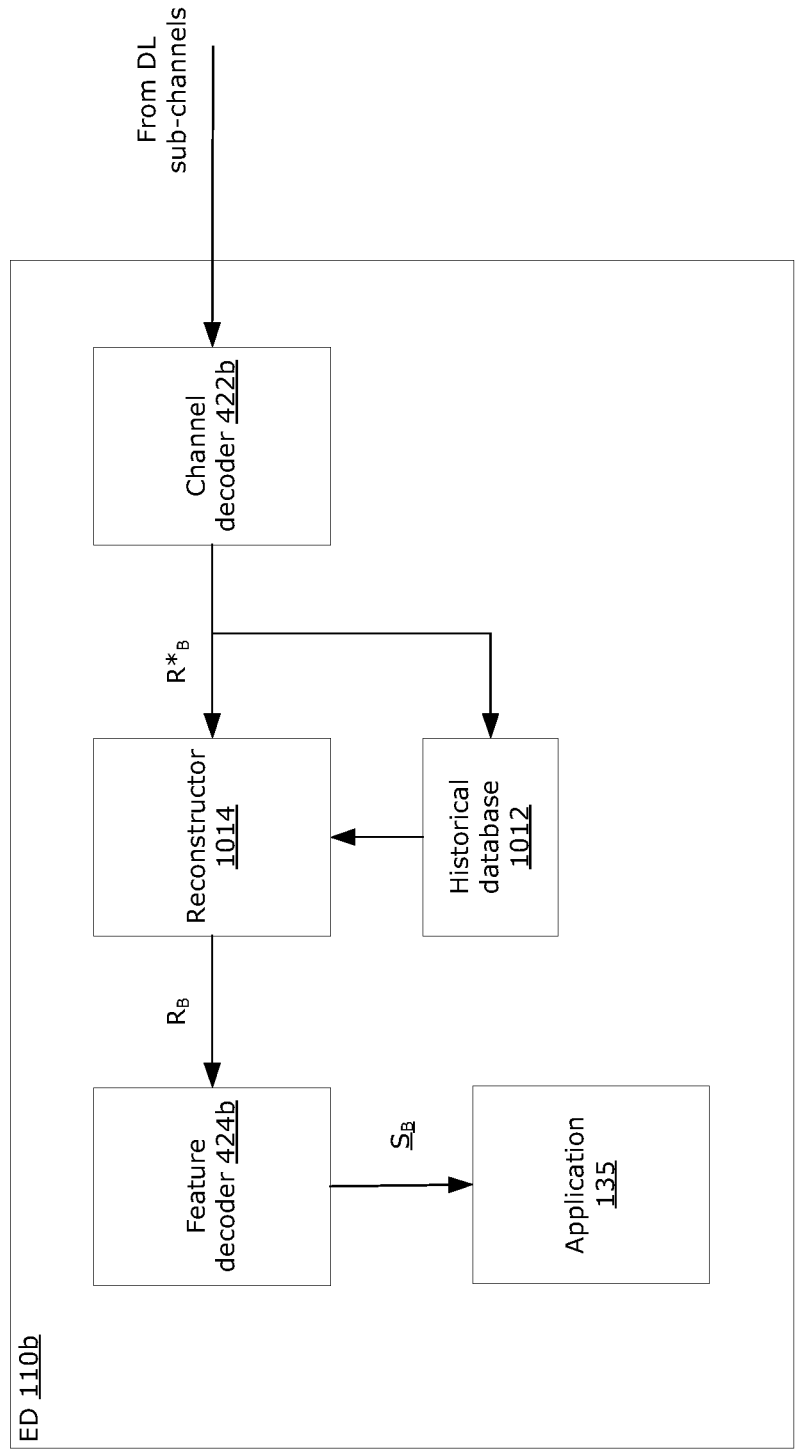

Reference is now made to FIGS. 14 and 15, for discussing example methods for reducing redundancy in DL transmission of features. FIG. 15 shows an example receiving ED 110b. It should be understood that the receiving ED 110b of FIG. 15 has been illustrated in a simplified form, for ease of understanding. The various details of implementation as discussed above (e.g., sub-channelization) may be equally application to the example shown in FIG. 15.

The receiving ED 110b and the BS 120 may each maintain a respective historical database 1012, 1032 containing historical information about DL features. Although FIG. 14 shows the BS 120 having a database 1022 for storing historical information about UL features and a separate database 1032 for storing historical information about DL features, in some examples historical information about UL and DL features may be stored in a common historical database.

The use of the historical databases 1012, 1032 for reducing DL transmission of time-invariant DL features is similar to that described above for reducing UL transmission of time-invariant UL features. Therefore, the DL implementation will not be described in detail. Briefly, a reducer 1034 at the BS 120 may use information from the historical database 1032 to reduce the set of features $T_B$ to a reduced set of features $T^*_B$ for DL transmission. The BS 120 may generate a control message or header, which may be transmitted together with or separately from the transmission of DL features, to inform the receiving ED 110b of the non-transmitting DL feature(s). At the receiving ED 110b, a reconstructor 1014 may use information from the control message or header to identify which DL feature(s) have not been transmitted. The reconstructor 1014 may use information from the historical database 1012 to reconstruct the full set of received DL features $R_B$ from the reduced set of received features $R^*_B$. The historical information stored in the historical databases 1012, 1032 may be updated (and optionally timestamped) in a manner similar to that described above with respect to the historical databases 1002, 1022.

In further embodiments, any of the historical databases 1002, 1012, 1022, and 1032 may be supplemented or replaced by a predictor to provide information to the reducer 1004 and/or 1034 to reduce the set of transmitted features. For example, the information provided by the predictor may be decisions about which specific features are to be transmitted or not transmitted. In some examples, the predictor may be implemented by a DNN that is trained by any of the historical databases 1002, 1012, 1022, and 1032 (e.g., by reinforcement learning that uses the information in the historical database as experience).

In the above discussion, by omitting transmission of any feature(s) that has not changed from one data block to the next (or that has no substantial change), UL and DL transmission resources may be saved. In some examples, because the transmission takes place on a feature-level (rather than transmission of raw information), changes in the raw information that do not significantly change the feature (e.g., a change in the raw information that still falls within the same probability distribution) do not need to be transmitted, and resources can be saved.

Another type of redundancy is inter-sensor redundancy. When there are multiple transmitting EDs 110a monitoring a common subject, it is possible that there is some common information observed among the EDs 110a and/or some correlation between the information observed among EDs 110a. This type of redundancy may be easier to avoid when considering information on a feature-level rather than on the raw information level.

The BS 120 may, during the initiation phase, determine (e.g., using a machine-learning based process) that a first feature captured by a first transmitting ED 110a is strongly correlated with a second feature captured by a second transmitting ED 110a. If the first feature is of lower quality than the second feature, the BS 120 may send a DL control message to the first transmitting ED 110a to omit UL transmission of the first feature. The BS 120 may use the second feature received from the second transmitting ED 110a to substitute for the omitted first feature instead. This may help to reduce the use of UL channel resources.

As previously discussed, different applications on different receiving EDs 110b may be interested in different portions of the features. For example, in the example of a monitored crossroad being the observed subject, an application that simply tracks traffic density at this crossroad may be interested in only one or two features (e.g., number of detected vehicles), but another application that identifies drivers may be interested in more features (e.g., vehicle license plate, vehicle make/color, etc.). Such differences in the needs of different applications give rise to perception redundancy, discussed previously in the present disclosure.

For example, two receiving EDs 110b may have respective applications that require different features. Each ED 110b may generate and transmit UL control messages to inform the BS 120 to transmit only a designated subset of feature(s). Accordingly, the reducer 1034 at the BS 120 may reduce the DL features transmitted to each respective receiving ED 110b to only the requested subset of feature(s). At each receiving ED 110b, in order to decode the received information, the feature decoder requires a full feature set. Accordingly, the reconstructor 1014 may fill the non-transmitted feature(s) with random values or any other predefined values, because the non-transmitted feature(s) are not used by the application 135.

In some examples, reduction in DL transmission of features may be based on the requirements of human perception, rather than the requirements of machine applications. For example, the receiving ED 110b may identify the subset of required features based on feedback from a human user. Such feedback may be explicit (e.g., a human user manually selecting the type of information requested) or implicit (e.g., the ED 110b monitors what type of information is of interest to a human user, using monitoring methods such as eye-tracking sensors).

As previously discussed, the number of features N for the encoder and decoder DNNs is determined to provide an optimal compression ratio for a given channel capacity $C_{limit}$ (e.g., the capacity purchased by a service provider). The upper boundary of the true occupied channel capacity $C_{occupy}$ is the KL divergence value, and must be within $C_{limit}$. It should be noted that $C_{occupy}$ is the maximum occupied channel capacity if all N features are transmitted and received. However, because the applications may require only a portion of the features, rather than all N features, fewer than N features need to be transmitted. This means that, the instant channel capacity $C_{instant}$ can be less than the maximum occupied channel capacity $C_{occupy}$. Accordingly, there may be savings in physical channel resources.

The various example methods for addressing different types of redundancy, as discussed above, may be used in combination. Generally, these example methods may reduce redundancies and reduce the amount of information that needs to be transmitted between the EDs and the core network, over the UL and DL physical channels. Using the various methods discussed, savings in the physical layer resource may be achieved. The example methods discussed above help to reduce the number of features that need to be transmitted and hence may result in an instant channel capacity $C_{instant}$ that is less than the maximum occupied channel capacity $C_{occupy}$. This helps to illustrate how transmission of features, rather than raw information, may be more efficient and may provide advantages.

It should be understood that some or all of the above-discussed example methods for reducing redundancies may be used independently of the machine-learning based compression techniques described earlier. For example, transmission of any type of information, using any compression technique, may benefit from the various techniques to reduce redundancies (e.g., perception redundancy).

The present disclosure has described methods and systems for feature-driven communications. In particular, a machine-learning based approach is used to train DNNs for implementing probabilistic feature encoders and probabilistic feature decoders.

Using appropriate training parameters, the core network may train different encoder/decoder DNN pairs to suit different physical channel capacities, and may generate different information representation and transmission schemes. These schemes may be embodied in the configuration and parameters (e.g., including the compression ratio and sub-channelization) of the trained encoder and decoder DNN pairs.

The transmitting EDs may collect raw information, extract feature(s) from the raw information, and transmit the expectation values of the feature(s) using the transmission scheme (which may be defined by the variance values of the feature(s) in a sub-channelization mode). In other words, instead of transmitting the raw information, the EDs transmit extracted feature(s) that describe probability distributions. At the core network, the received UL features are translated to DL features for transmission DL to one or more receiving EDs, which in turn decode the DL features into recovered information. Thus, in examples disclosed herein, optimization (including reduction of redundancies) may be based on features rather than the raw information.

In examples described herein, optimization may account for common information captured by multiple EDs observing the same subject, and may also account for correlation of different features among multiple EDs. Each transmitting may autonomously determine which features are time-varying (or time-invariant), in order to mainly transmit time-varying features. Similarly, mainly time-varying features may be transmitted DL to the receiving EDs. The core network may receiving information from the receiving EDs so that only feature(s) of interest (e.g., feature(s) relevant to applications of the receiving EDs) are transmitted DL.

It should be understood that examples disclosed herein may not be limited to applications for machine-to-machine communications. Machine-to-human communications, human-to-machine communications, or human-to-human communications may benefit from the examples disclosed. In general, the feature-based approach to communications may enable compression on a feature-level (rather than the raw information level), and may enable reduction of some redundancies as discussed above. For human-to-machine or human-to-human communications, conversion of the human input to machine-understandable input (e.g., voice-to-text conversion or machine reading of input text) may facilitate extraction of features from the human input.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An apparatus for feature-based communications, the apparatus comprising:
 a receiver for receiving, from at least one transmitting electronic device (ED), a set of received features representing a subject, each received feature providing information about a respective probability distribution that each represents one or more aspects of the subject;
 a translator, implemented using a deep neural network (DNN), for encoding the set of received features into a set of machine-learning based transmission features representing the subject, each transmission feature providing information about a respective probability distribution that each represents one or more aspects of the subject, at least one probability distribution represented by the set of transmission features being different from the set of received features;
 a reducer configured to reduce the set of transmission features; and
 a transmitter for transmitting the set of transmission features after reducing by the reducer to at least one receiving ED.

2. The apparatus of claim 1, wherein the translator comprises:
 a feature decoder DNN configured to recover, from the set of received features, a set of recovered information about the subject from the probability distributions of the received features; and
 a feature encoder DNN configured to extract one or more transmission features from the set of recovered information and generate the set of transmission features that compresses the recovered information by a compression ratio.

3. The apparatus of claim 2, wherein the feature encoder DNN implements a probabilistic encoder to provide the compression ratio that satisfies a predetermined physical channel capacity limit for a transmission channel.

4. The apparatus of claim 3, wherein the feature encoder DNN is trained to satisfy: a first target of maximizing likelihood between information recovered at a corresponding decoder DNN of the receiving ED and source information at the transmitting ED, and a second target of minimizing an upper boundary of mutual information to be within the predetermined physical channel capacity limit.

5. The apparatus of claim 1, wherein the reducer is configured to reduce the set of transmission features by omitting a feature that is unchanged compared to a previous set of transmission features.

6. The apparatus of claim 1, wherein the reducer is configured to reduce the set of transmission features in accordance with a requested subset of features from the receiving ED.

7. The apparatus of claim 1, wherein the transmitter is configured to:
 assign a sub-channel for transmission of each respective transmission feature, the assigning being based on a relative importance of each transmission feature; and
 transmit the set of transmission features over the sub-channels.

8. The apparatus of claim 7 wherein each transmission feature indicates an expectation value of the respective probability distribution and a variance value of the respective probability distribution, and the relative importance of each transmission feature is determined based on the variance value of each respective feature.

9. The apparatus of claim 8 wherein the transmitter is further configured to:
 select a transmission scheme for each assigned sub-channel, the transmission scheme being selected to indicate the variance value of the transmission feature assigned to each respective sub-channel; and
 transmit the expectation value of each transmission feature over the respective sub-channel in accordance with the respective transmission scheme.

10. The apparatus of claim 9 wherein the transmitter is further configured to:
 generate a control message or header indicating the selected transmission scheme and assigned sub-channel for each transmission feature; and
 transmit the control message or header to the receiving ED.

11. An apparatus for feature-based communications, the apparatus comprising:
 a receiver for receiving over a transmission channel, from a base station (BS), a set of machine-learning based transmitted features representing a subject, each transmitted feature providing information about a respective probability distribution that each represents one or more aspects of the subject; and a feature decoder DNN configured to decode, from the set of transmitted features, a set of recovered information about the subject, wherein the feature decoder DNN is trained to satisfy: a first target of maximizing likelihood between the set of recovered information and source information about the subject, and a second target of minimizing an information bottleneck to be within a predetermined physical channel capacity limit of the transmission channel.

12. The apparatus of claim 11, wherein the feature decoder DNN implements a probabilistic decoder to recover the set of recovered information from the probability distributions of the transmitted features.

13. The apparatus of claim 11, further comprising a machine application configured to process the recovered information to make a machine-based decision.

14. The apparatus of claim 13, wherein the machine application requires a subset of the recovered information, and wherein the apparatus is configured to transmit a control message to the BS to reduce the features in the set of transmitted features.

15. A method for training an encoder and decoder pair for feature-based communications, the method comprising:

receiving a set of training data samples, the training data samples representing probability distributions representing one or more features of a subject;

training a probabilistic feature encoder and probabilistic feature decoder pair together, using joint optimization, the feature encoder and feature decoder pair being trained together to satisfy: a first target of maximizing likelihood between information recovered by the decoder and source information encoded by the encoder, and a second target of minimizing an upper boundary of mutual information to be within a predetermined physical channel capacity limit; and after determining that training has converged to satisfy the first and second targets, storing trained weights for the feature encoder and feature decoder pair.

16. The method of claim 15, further comprising:

transmitting the trained weights for the feature encoder or the trained weights for the feature decoder to at least one electronic device (ED), to enable the ED to implement the respective feature encoder or feature decoder.

17. The method of claim 15, wherein the feature decoder is implemented using a feature decoder deep neural network (DNN), and wherein the feature encoder is implemented using a feature encoder DNN.

* * * * *